US012602801B2

(12) United States Patent
Hitomi

(10) Patent No.: US 12,602,801 B2
(45) Date of Patent: Apr. 14, 2026

(54) IMAGE PROCESSING CIRCUITRY AND IMAGE PROCESSING METHOD FOR DEPTH ESTIMATION IN A TIME-OF-FLIGHT SYSTEM

(71) Applicant: Sony Semiconductor Solutions Corporation, Atsugi (JP)

(72) Inventor: Yasunobu Hitomi, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 530 days.

(21) Appl. No.: 18/025,643

(22) PCT Filed: Sep. 13, 2021

(86) PCT No.: PCT/EP2021/075101
§ 371 (c)(1),
(2) Date: Mar. 10, 2023

(87) PCT Pub. No.: WO2022/058280
PCT Pub. Date: Mar. 24, 2022

(65) Prior Publication Data
US 2023/0351622 A1      Nov. 2, 2023

(30) Foreign Application Priority Data

Sep. 18, 2020    (EP) .................................... 20197012

(51) Int. Cl.
*G06T 7/521* (2017.01)
*G01S 7/481* (2006.01)
(Continued)

(52) U.S. Cl.
CPC ............ *G06T 7/521* (2017.01); *G01S 7/4816* (2013.01); *G01S 17/894* (2020.01); *G06T 5/20* (2013.01);
(Continued)

(58) Field of Classification Search
CPC .. G06T 7/521; G06T 5/20; G06T 5/92; G06T 2207/10028; G06T 5/50; G06T 5/70;
(Continued)

(56) References Cited

U.S. PATENT DOCUMENTS

2011/0292036 A1* 12/2011  Sali ......................... G06T 17/00
345/419
2012/0050074 A1    3/2012  Bechtel
(Continued)

FOREIGN PATENT DOCUMENTS

WO     WO-2018094307 A1     5/2018
WO     WO-2019215172 A1    11/2019

OTHER PUBLICATIONS

Claude Verboomen's work, "Nosaturationhandling: LRD Failure Analysis details" v0.3, 20 pgs.
(Continued)

*Primary Examiner* — Kathleen Y Dulaney
(74) *Attorney, Agent, or Firm* — XSENSUS LLP

(57) ABSTRACT

An image processing circuitry for a time-of-flight system configured to: generate, based on obtained image data of a plurality of pixels representing a time-of-flight measurement of light reflected from a scene that is illuminated with spotted light, corresponding component data including component values of the plurality of pixels; calculate, based on the generated component data, corresponding phase amplitude image data including phase amplitude values of the plurality of pixels; determine, based on the calculated phase amplitude image data, spot pixel regions and a valley pixel region among the plurality of pixels; and calculate a depth value for each of the spot pixel regions in the first set of spot pixel regions.

20 Claims, 10 Drawing Sheets

200 ⌐

Generating, based on obtained image data of a plurality of pixels representing a time-of-flight measurement of light reflected from a scene that is illuminated with spotted light, corresponding component data including component values of the plurality of pixels 201

Calculating, based on the generated component data, corresponding phase amplitude image data including phase amplitude values of the plurality of pixels 202

Determining, based on the calculated phase amplitude image data, spot pixel regions and a valley pixel region among the plurality of pixels 203

Determining, in each of the spot pixel regions, a spot peak pixel having a maximum phase amplitude value among the phase amplitude values of the respective spot pixel region 204

Determining a first set of spot pixel regions, wherein the first set of spot pixel regions includes such spot pixel regions in which the determined maximum phase amplitude value of the spot peak pixel is above a predetermined threshold 205

Determining, in each of the spot pixel regions in the first set of spot pixel regions, a predetermined number of non-saturated pixels or non-saturated pixels in a predetermined range centered at the spot peak pixel which have a phase amplitude value below the predetermined threshold 206

Calculating a depth value for each of the spot pixel regions in the first set of spot pixel regions based on component values of the predetermined number of non-saturated pixels 207

Correlating the calculated phase amplitude image data with a Gaussian kernel to obtain Gaussian correlated phase amplitude image data including correlated phase amplitude values of the plurality of pixels 208

Applying a local maximum filter on the Gaussian correlated phase amplitude image data to determine the spot pixel regions 209

Determining the spot peak pixel and the predetermined number of non-saturated pixels or the non-saturated pixels in a predetermined range centered at the spot peak pixel based on the correlated phase amplitude values 210

(51) Int. Cl.

| | |
|---|---|
| *G01S 17/894* | (2020.01) |
| *G06T 5/20* | (2006.01) |
| *G06T 5/92* | (2024.01) |

(52) U.S. Cl.
CPC ...... *G06T 5/92* (2024.01); *G06T 2207/10028* (2013.01)

(58) Field of Classification Search
CPC .......... G06T 7/001; G06T 2207/10024; G06T 2207/10152; G06T 2207/20081; G06T 2207/20224; G06T 2207/30148; G06T 2207/10048; G06T 2207/10061; G01S 7/4816; G01S 17/894; G01S 7/4914; G01S 7/493; G01S 17/36; G01S 17/89; G01N 21/8851; G01N 2021/8887; G01N 21/9501; H10P 74/203; H10P 74/277
USPC .................................. 382/154, 106; 345/419
See application file for complete search history.

(56) References Cited

U.S. PATENT DOCUMENTS

| | | | |
|---|---|---|---|
| 2016/0073076 | A1 | 3/2016 | Carroll |
| 2017/0195653 | A1* | 7/2017 | Trail .................... H04N 13/366 |
| 2018/0048801 | A1 | 2/2018 | Kiser |
| 2020/0072946 | A1 | 3/2020 | Fisher |
| 2021/0065392 | A1* | 3/2021 | Bleyer .................. H04N 23/73 |
| 2022/0057519 | A1* | 2/2022 | Goldstein .............. G01S 17/88 |

OTHER PUBLICATIONS

Syed Z. Masood et al, "Automatic correction of saturated regions in photographs using cross-channel correlation", School of Electrical Engineering and Computer Science, University of Central Florida, 2009, 9 pgs., vol. 28 No. 7.

* cited by examiner

Figure 9:
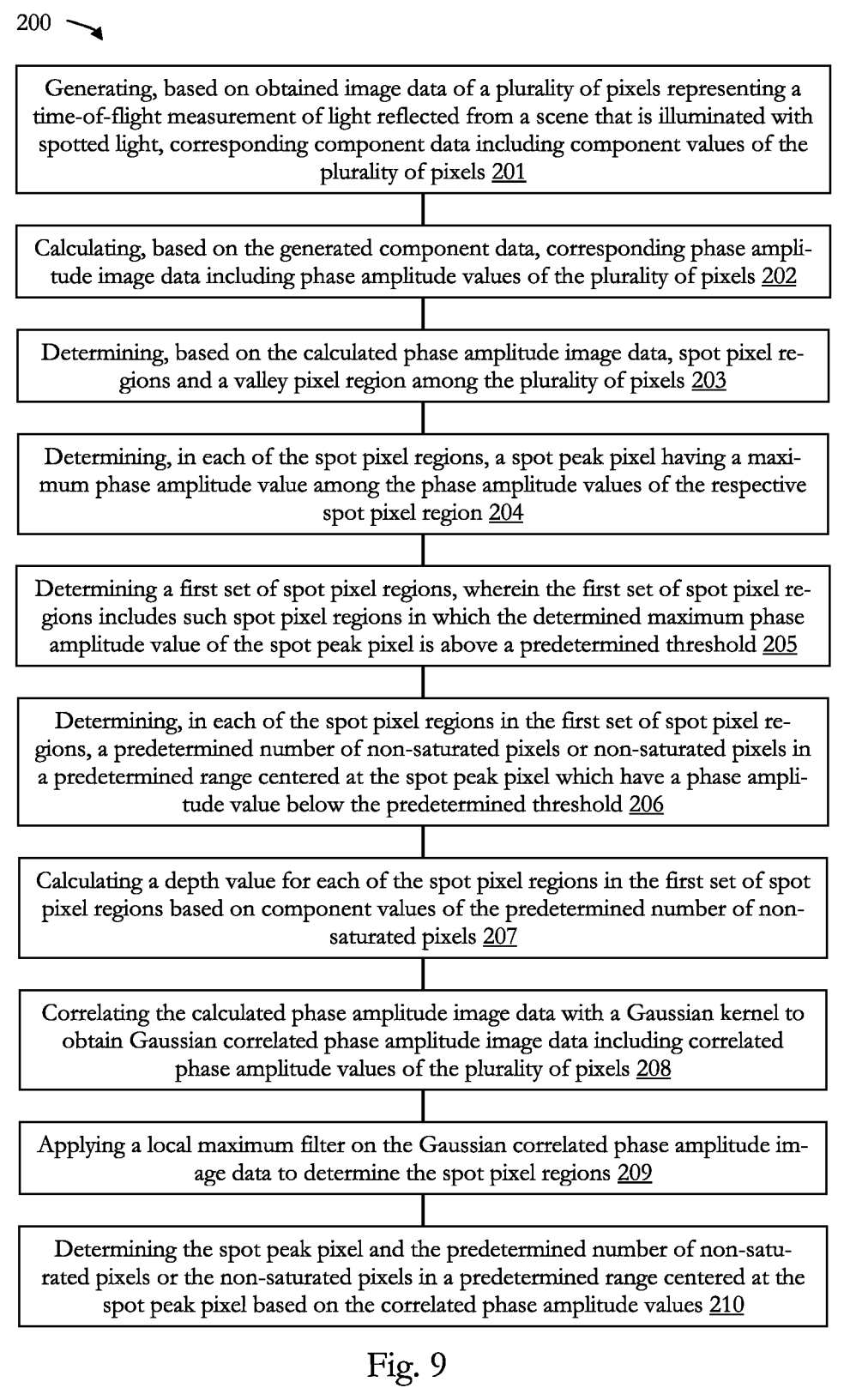

200

Generating, based on obtained image data of a plurality of pixels representing a time-of-flight measurement of light reflected from a scene that is illuminated with spotted light, corresponding component data including component values of the plurality of pixels 201

Calculating, based on the generated component data, corresponding phase amplitude image data including phase amplitude values of the plurality of pixels 202

Determining, based on the calculated phase amplitude image data, spot pixel regions and a valley pixel region among the plurality of pixels 203

Determining, in each of the spot pixel regions, a spot peak pixel having a maximum phase amplitude value among the phase amplitude values of the respective spot pixel region 204

Determining a first set of spot pixel regions, wherein the first set of spot pixel regions includes such spot pixel regions in which the determined maximum phase amplitude value of the spot peak pixel is above a predetermined threshold 205

Determining, in each of the spot pixel regions in the first set of spot pixel regions, a predetermined number of non-saturated pixels or non-saturated pixels in a predetermined range centered at the spot peak pixel which have a phase amplitude value below the predetermined threshold 206

Calculating a depth value for each of the spot pixel regions in the first set of spot pixel regions based on component values of the predetermined number of non-saturated pixels 207

Correlating the calculated phase amplitude image data with a Gaussian kernel to obtain Gaussian correlated phase amplitude image data including correlated phase amplitude values of the plurality of pixels 208

Applying a local maximum filter on the Gaussian correlated phase amplitude image data to determine the spot pixel regions 209

Determining the spot peak pixel and the predetermined number of non-saturated pixels or the non-saturated pixels in a predetermined range centered at the spot peak pixel based on the correlated phase amplitude values 210

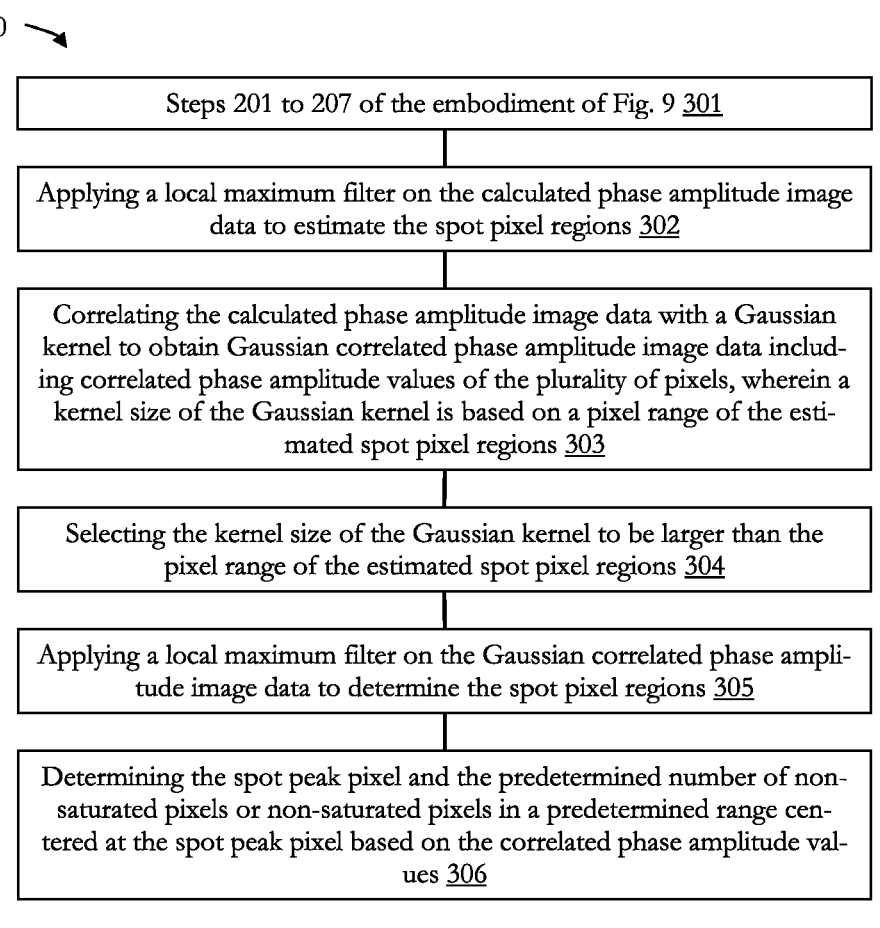

Steps 201 to 207 of the embodiment of Fig. 9 301

Applying a local maximum filter on the calculated phase amplitude image data to estimate the spot pixel regions 302

Correlating the calculated phase amplitude image data with a Gaussian kernel to obtain Gaussian correlated phase amplitude image data including correlated phase amplitude values of the plurality of pixels, wherein a kernel size of the Gaussian kernel is based on a pixel range of the estimated spot pixel regions 303

Selecting the kernel size of the Gaussian kernel to be larger than the pixel range of the estimated spot pixel regions 304

Applying a local maximum filter on the Gaussian correlated phase amplitude image data to determine the spot pixel regions 305

Determining the spot peak pixel and the predetermined number of non-saturated pixels or non-saturated pixels in a predetermined range centered at the spot peak pixel based on the correlated phase amplitude values 306

Steps 201 to 207 of the embodiment of Fig. 9 401

Calculating a score map based on a learned magnitude relation of phase amplitude values of pixel pairs, wherein the spot pixel regions are determined by local extrema of the score map 402

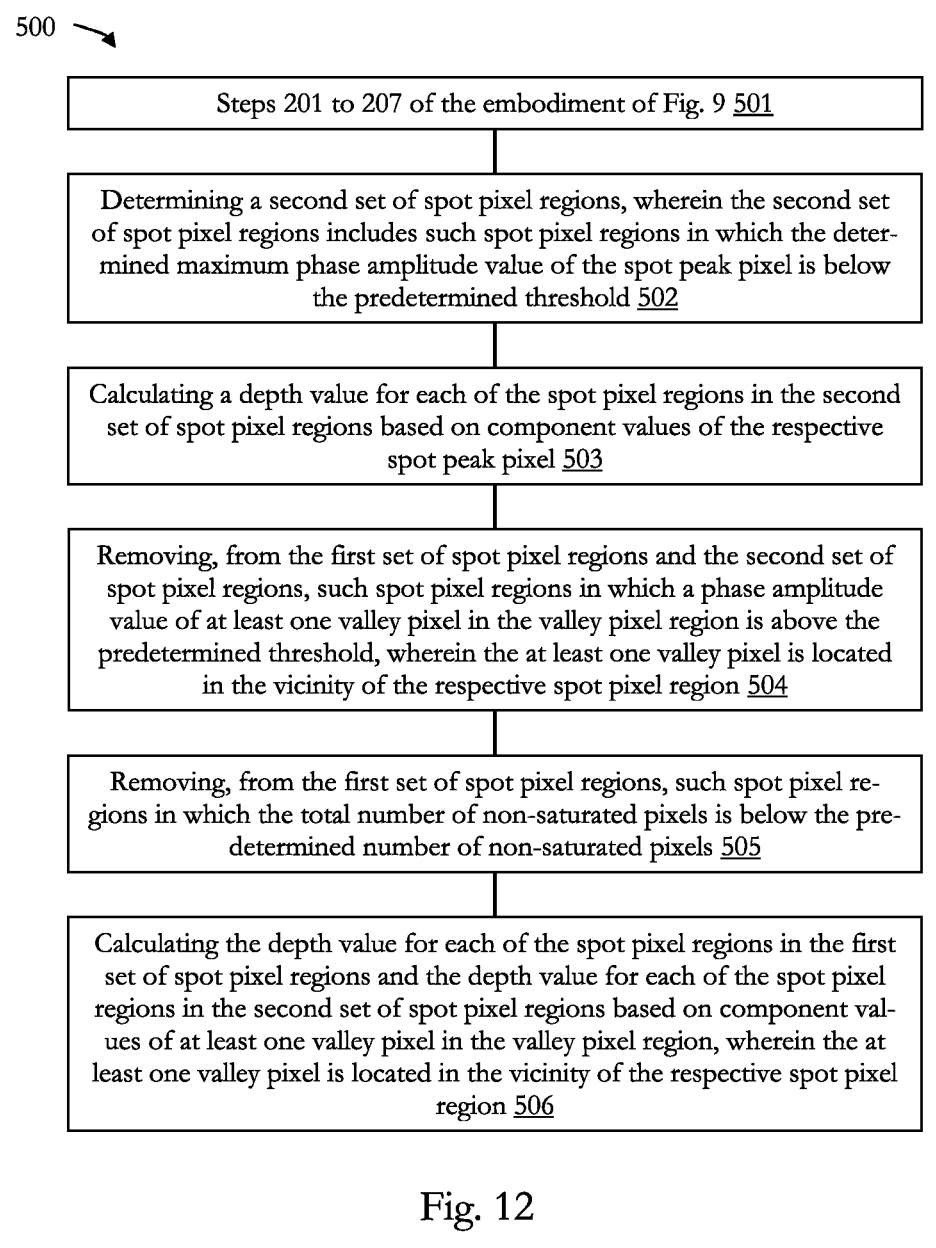

| |
|---|
| Steps 201 to 207 of the embodiment of Fig. 9 501 |

| |
|---|
| Determining a second set of spot pixel regions, wherein the second set of spot pixel regions includes such spot pixel regions in which the determined maximum phase amplitude value of the spot peak pixel is below the predetermined threshold 502 |

| |
|---|
| Calculating a depth value for each of the spot pixel regions in the second set of spot pixel regions based on component values of the respective spot peak pixel 503 |

| |
|---|
| Removing, from the first set of spot pixel regions and the second set of spot pixel regions, such spot pixel regions in which a phase amplitude value of at least one valley pixel in the valley pixel region is above the predetermined threshold, wherein the at least one valley pixel is located in the vicinity of the respective spot pixel region 504 |

| |
|---|
| Removing, from the first set of spot pixel regions, such spot pixel regions in which the total number of non-saturated pixels is below the predetermined number of non-saturated pixels 505 |

| |
|---|
| Calculating the depth value for each of the spot pixel regions in the first set of spot pixel regions and the depth value for each of the spot pixel regions in the second set of spot pixel regions based on component values of at least one valley pixel in the valley pixel region, wherein the at least one valley pixel is located in the vicinity of the respective spot pixel region 506 |

Fig. 12

IMAGE PROCESSING CIRCUITRY AND IMAGE PROCESSING METHOD FOR DEPTH ESTIMATION IN A TIME-OF-FLIGHT SYSTEM

CROSS-REFERENCE TO RELATED APPLICATIONS

The present application is based on PCT filing PCT/EP2021/075101, filed Sep. 13, 2021, and claims priority to EP Application Serial No. 20197012.6, filed Sep. 18, 2020, the entire contents of each are incorporated herein by reference.

TECHNICAL FIELD

The present disclosure generally pertains to an image processing circuitry an image processing method for a time-of-flight system.

TECHNICAL BACKGROUND

Generally, time-of-flight (ToF) devices or systems are known, which are used for determining a distance to or a depth map of (objects in) a scene that is illuminated with light. Typically, time-of-flight systems include a light source (e.g. a laser), optical parts (e.g. lenses), an image sensor (e.g. array of current assisted photonic demodulator (CAPD) pixels), a control unit (and/or processing unit) etc.

Time-of-flight includes a variety of methods that measure the time that a particle or a light wave needs to travel a distance in a medium. Known ToF systems can obtain depth measurements of objects in a scene for every pixel of the depth image simultaneously, wherein the depth image is captured with an image sensor. For capturing this image, the ToF system typically illuminates the scene with, for instance, a modulated light wave and images the backscattered/reflected light wave with an optical lens portion on the image sensor having, for example, a pixel array, wherein a gain of the pixel array is modulated accordingly. Signal depth information can be obtained from the resulting modulation.

Full-field ToF systems are known in which the scene is illuminated with a continuous spatial light profile such as, for example, a light beam which has a high-intensity area in the center of the light beam with a continuously decreasing light intensity away from the center of the light beam.

Moreover, spot ToF systems are known in which the scene is illuminated with a light pattern of (separated) high-intensity and low-intensity light areas such as, for example, a pattern of light spots (e.g. light dots).

Generally, in spot ToF systems the light for illuminating the scene is concentrated in, for example, the light spots and imaged to the scene. At least a part of the light concentrated in the light spots is backscattered/reflected from objects included in the scene. The reflected light is imaged onto the image sensor including a pixel array and a pattern of spot pixel regions may be obtained on which a higher light intensity is present according to the light spots imaged onto the scene. Thus, a plurality of spot pixel regions may be processed for obtaining depth information in spot ToF systems.

Although there exist techniques for image processing in a time-of-flight system, it is generally desirable to improve the existing techniques.

SUMMARY

According to a first aspect the disclosure provides an image processing circuitry for a time-of-flight system configured to:

generate, based on obtained image data of a plurality of pixels representing a time-of-flight measurement of light reflected from a scene that is illuminated with spotted light, corresponding component data including component values of the plurality of pixels;

calculate, based on the generated component data, corresponding phase amplitude image data including phase amplitude values of the plurality of pixels;

determine, based on the calculated phase amplitude image data, spot pixel regions and a valley pixel region among the plurality of pixels;

determine, in each of the spot pixel regions, a spot peak pixel having a maximum phase amplitude value among the phase amplitude values of the respective spot pixel region;

determine a first set of spot pixel regions, wherein the first set of spot pixel regions includes such spot pixel regions in which the determined maximum phase amplitude value of the spot peak pixel is above a predetermined threshold;

determine, in each of the spot pixel regions in the first set of spot pixel regions, a predetermined number of non-saturated pixels or non-saturated pixels in a predetermined range centered at the spot peak pixel which have a phase amplitude value below the predetermined threshold; and calculate a depth value for each of the spot pixel regions in the first set of spot pixel regions based on component values of the predetermined number of non-saturated pixels.

According to a second aspect the disclosure provides an image processing method for a time-of-flight system comprising:

generating, based on obtained image data of a plurality of pixels representing a time-of-flight measurement of light reflected from a scene that is illuminated with spotted light, corresponding component data including component values of the plurality of pixels;

calculating, based on the generated component data, corresponding phase amplitude image data including phase amplitude values of the plurality of pixels;

determining, based on the calculated phase amplitude image data, spot pixel regions and a valley pixel region among the plurality of pixels;

determining, in each of the spot pixel regions, a spot peak pixel having a maximum phase amplitude value among the phase amplitude values of the respective spot pixel region;

determining a first set of spot pixel regions, wherein the first set of spot pixel regions includes such spot pixel regions in which the determined maximum phase amplitude value of the spot peak pixel is above a predetermined threshold;

determining, in each of the spot pixel regions in the first set of spot pixel regions, a predetermined number of non-saturated pixels or non-saturated pixels in a predetermined range centered at the spot peak pixel which have a phase amplitude value below the predetermined threshold; and calculating a depth value for each of the spot pixel regions in the first set of spot pixel regions based on component values of the predetermined number of non-saturated pixels.

Further aspects are set forth in the dependent claims, the following description and the drawings.

BRIEF DESCRIPTION OF THE DRAWINGS

Embodiments are explained by way of example with respect to the accompanying drawings, in which:

FIG. 9 schematically illustrates in a flow diagram a second embodiment of an image processing method;

FIG. 10 schematically illustrates in a flow diagram a third embodiment of an image processing method;

FIG. 11 schematically illustrates in a flow diagram a fourth embodiment of an image processing method; and FIG. 12 schematically illustrates in a flow diagram a fifth embodiment of an image processing method.

DETAILED DESCRIPTION OF EMBODIMENTS

Figure 6:
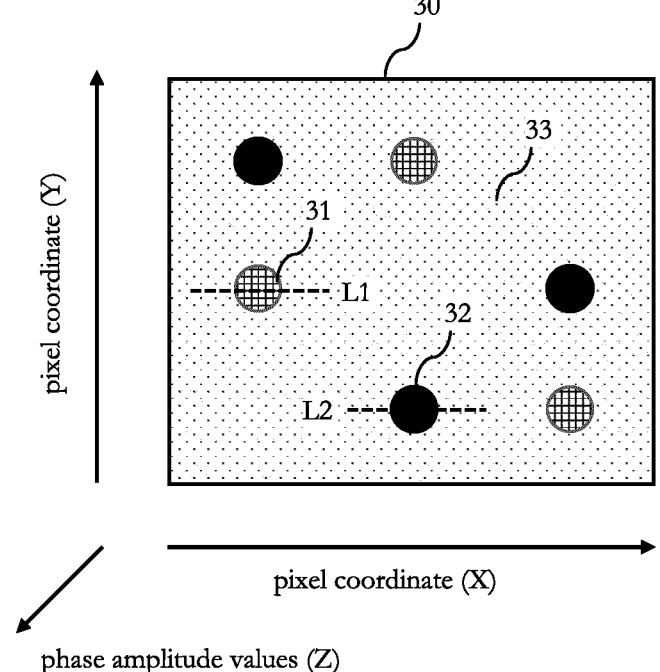
FIG. 6 schematically illustrates an embodiment of spot pixel regions and corresponding phase amplitude values.
Figure 6:
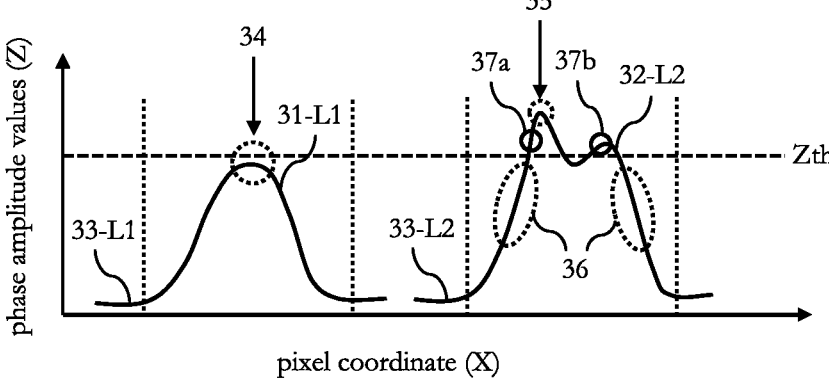

Before a detailed description of the embodiments under reference of FIG. 6 is given, general explanations are made.

As mentioned in the outset, time-of-flight (ToF) devices or systems are known, which are used for determining a distance to or a depth map of (objects in) a scene that is illuminated with light. Typically, in some embodiments, a time-of-flight system includes a light source (e.g. a laser), optical parts (e.g. lenses), an image sensor (e.g. array of current assisted photonic demodulator (CAPD) pixels), a control unit (and/or processing unit) etc.

In some embodiments, a ToF system obtains depth measurements of objects in a scene for every pixel of the depth image simultaneously, wherein the depth image is captured with an image sensor.

For capturing this image the ToF system illuminates the scene with a modulated light wave (emits a modulated light wave) and images the backscattered/reflected light wave with an optical lens portion (e.g. optical lenses) onto the image sensor having a pixel array (a plurality of pixels arranged according to a predetermined pattern such as an arrangement in rows and columns, as generally known), wherein a gain of the pixel array is modulated according to the modulation of the emitted light wave (according to a demodulation signal corresponding to the modulation signal, wherein the demodulation signal may be phase-shifted with respect to the modulation signal of the light). The signal depth information is obtained from the modulation/demodulation, wherein such ToF systems are called indirect ToF (iToF in the following) systems, wherein a distance is determined based on a phase shift of a reflected light relative to a sensing signal.

Moreover, as further mentioned in the outset, full-field ToF systems are known in which the scene is illuminated with a continuous spatial light profile such as, for example, a light beam which has a high-intensity area in the center of the light beam with a continuously decreasing light intensity away from the center of the light beam.

For enhancing the general understanding of the present disclosure, an embodiment of an iToF system 1 is discussed under reference of FIG. 1 in the following, there the embodiment of the iToF system 1 is schematically illustrated in a block diagram.

The iToF system 1 is a full-field iToF system for depth sensing or providing a distance measurement. The iToF system 1 includes a light source 2, a control unit 3, an image sensor 4 and an optical lens 5.

The light source 2 emits intensity-modulated light (in time) to a scene 6 (illuminates the scene 6) including an object 7, which reflects at least part of the (illumination) light. The reflected light from the object 7 is imaged by the optical lens 5 onto the image sensor 4.

The control unit 3 controls the overall operation of the ToF system 1 and includes an image processing circuitry 8 and a 3D image reconstruction unit 9.

The control unit 3 controls the light emission timing of the light source 2 based on a modulation signal (which may be e.g. a rectangular modulation signal having a modulation period 1) applied to the light source 2. The control unit 3 applies a demodulation signal to the image sensor 4 which corresponds to the modulation signal applied to the light source 2.

The image sensor 4 generates image data including pixel values of a plurality of pixels in accordance with an amount of reflected light imaged by the optical lens 5 onto each of the pixels and in accordance with the demodulation signal.

The image processing circuitry 8 obtains the image data from the image sensor 4. The image processing circuitry 8 determines, based on the obtained image data, a phase-shift of the detected reflected light with respect to the emitted light. Then, the image processing circuitry 8 calculates a distance d or generally depth information for the scene 6, for example, to the object 7 based on the determined phase-shift.

As generally known, the (unambiguous) range of a distance measurement of an iToF system is given by:

$$\text{range} = \frac{T \cdot c}{2}.$$

Here, c is the speed of light and T is the modulation period of the modulation signal.

The depth information (distance) for the scene 6 is fed from the image processing circuitry 8 to the 3D reconstruction unit 9, which constructs (generates) a 3D image, 3D depth map or 3D point cloud of the scene 6 based on the depth information from the image processing circuitry 8.

Returning to the general explanations, as further mentioned in the outset, spot iToF systems are known in which the scene is illuminated with a light pattern of (separated)

high-intensity and low-intensity light areas such as, for example, a pattern of light spots (e.g. light dots).

In some embodiments, in a spot iToF system the light for illuminating the scene is concentrated in, for example, light spots and imaged onto the scene. At least a part of the light concentrated in the light spots is backscattered/reflected from objects included in the scene. The reflected light is imaged onto an image sensor including a pixel array (a plurality of pixels arranged in rows and columns) of the spot iToF system.

In some embodiments, spot pixel regions among the plurality of pixels are observed, wherein the spot pixel regions measure a higher light intensity according to the light spots imaged onto the scene than other pixels among the plurality of pixels (valley pixel region). Thus, in such spot iToF systems, spot pixel regions and a valley pixel region are processed for obtaining depth information about the objects in the scene.

For further enhancing the general understanding of the present disclosure, an embodiment of an iToF system 10 is discussed under reference of FIG. 2 in the following, there the embodiment of the iToF system 10 is schematically illustrated in a block diagram, wherein the following explanation is generally applicable in the present disclosure also to other embodiments.

The iToF system 10 is a spot iToF system for depth sensing or providing a distance measurement. The iToF system 10 includes a light source 11, a control unit 12 and an image sensor 4'.

The light source 11 emits spatially modulated light to a scene 13 including objects 14 and 15. In other words, the light source 11 emits spotted light to the scene 13, which is reflected at least in parts by the objects 14 and 15.

The spotted light is basically light having a spatial light pattern including high-intensity areas 16 and low-intensity areas 17 and, thus, a plurality of light spots corresponding to the high-intensity areas 16 is projected onto the scene 13 or the scene 13 is illuminated with spotted light. The plurality of light spots may have a certain spatial light intensity profile, for example, a Gaussian light intensity profile or the like.

Moreover, the light source 11 emits the spatially modulated light in an intensity-modulated manner (in time) to the scene 13, wherein the light source 11 modulates the light in time based on a modulation signal obtained from the control unit 12.

The control unit 12 controls the overall operation of the iToF system 10 and includes an image processing circuitry 18 and a 3D image reconstruction unit 19.

The control unit 12 controls the light emission timing of the light source 11 based on a modulation signal (which may be e.g. a rectangular modulation signal having a modulation period 1) applied to the light source 11. The control unit 12 applies a demodulation signal to the image sensor 4' which corresponds to the modulation signal applied to the light source 11.

Figure 1:
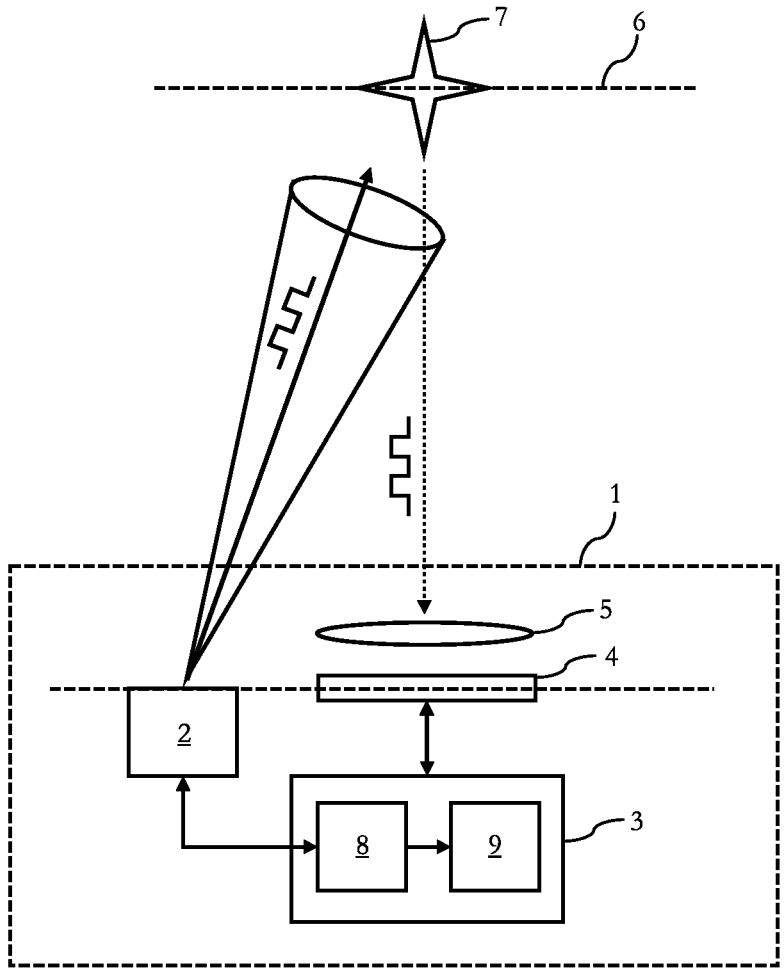
FIG. 1 schematically illustrates in a block diagram an embodiment of an iToF system configured as a full-field iToF system.

The image sensor 4' corresponds to the image sensor 4 of the embodiment discussed under reference of FIG. 1 including the optical lens 5. The image sensor 4' generates image data including pixel values of a plurality of pixels in accordance with an amount of reflected light imaged onto each of the pixels and in accordance with the demodulation signal.

Typically, the plurality of light spots corresponding to the high-intensity areas 16 projected onto the scene 13, may result in a corresponding light pattern on the plurality of pixels. In other words, spot pixel regions may be present among the plurality of pixels (and thus in the pixel values included in the obtained image data) and a valley pixel region may be present among the plurality of pixels (and thus in the pixel values included in the obtained image data). The spot pixel regions (i.e. the pixel values of pixels included in the spot pixel regions) may include signal contributions from the light reflected at least in part at the objects 14 and 15, from background light, multi-path interference. The valley pixel region (i.e. the pixel values of pixels included in the valley pixel region) may include signal contributions background light and from multi-path interference.

Generally, a spot pixel region may include some pixels which are adjacent to each other and which may have, along a spatial dimension (e.g. a pixel coordinate such as a column coordinate in a pixel array), a spatial pixel value profile (in the obtained image data) corresponding the spatial light intensity profile of the plurality of light spots. Thus, among the pixels of the spot pixel region a spot peak pixel having a maximum pixel value (spot peak pixel value) among the pixel values of the pixels in the spot pixel region may be present.

Accordingly, the valley region may include the other pixels which are not included in the spot pixel regions.

The image processing circuitry 18 then obtains the image data from the image sensor 4'. The image processing circuitry 18 determines, based on the obtained image data, a phase-shift of the detected reflected light with respect to the emitted light for the spot pixel regions. Then, the image processing circuitry 18 calculates a distance d or generally depth information for the scene 13, for example, to the object 14 based on the determined phase-shift.

Figure 3:
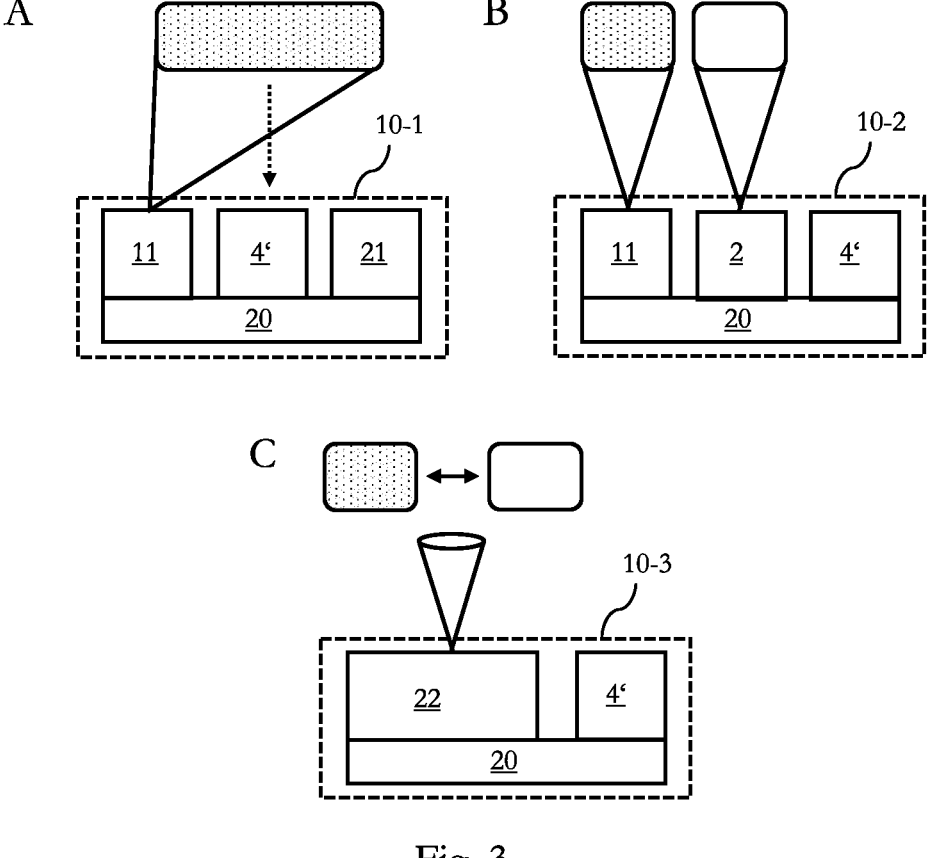
FIG. 3 schematically illustrates in a block diagram different configurations of embodiments of an iToF system.

Moreover, different configurations of embodiments of an iToF system are discussed under reference of FIG. 3, where three different configurations of an iToF system are schematically illustrated in a block diagram.

FIG. 3A schematically illustrates in a block diagram a configuration of an iToF system 10-1.

Figure 2:
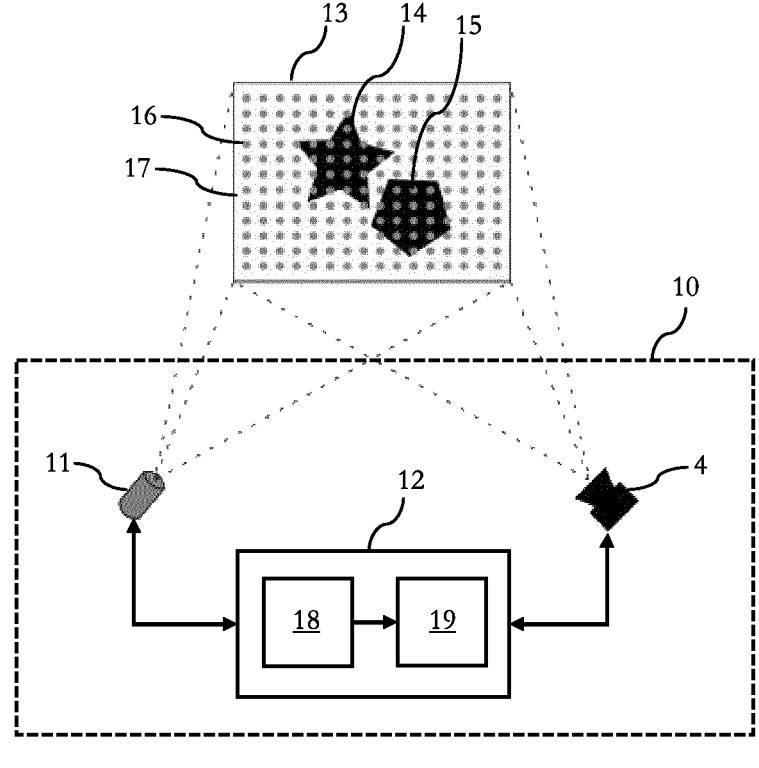
FIG. 2 schematically illustrates in a block diagram an embodiment of an iToF system configured as a spot iToF system.

The iToF system 10-1 includes the light source 11 and the image sensor 4' of the embodiment discussed under reference of FIG. 2, a circuitry 20-1 and a camera 21.

The circuitry 20-1 includes control circuitry, processing circuitry and the like to control the overall operation of the iToF system 10-1 and to process data obtained from the image sensor 4' and the camera 21.

The camera 21 is a red-green-blue (RGB) camera for capturing a color image of a scene (corresponding to the scene which is illuminated with spotted light by the light source 11).

FIG. 3B schematically illustrates in a block diagram a configuration of an iToF system 10-2.

The iToF system 10-2 includes the light source 11 and the image sensor 4' of the embodiment discussed under reference of FIG. 2, the light source 2 of the embodiment as discussed under reference of FIG. 1 and a circuitry 20-2.

Accordingly, the iToF system 10-2 combines a spot iToF system and a full-field iToF system in one iToF system and, thus, combines advantages of both systems.

FIG. 3C schematically illustrates in a block diagram a configuration of an iToF system 10-3.

The iToF system 10-3 includes a light source 22 which is a switchable combination of the light source 11 of the embodiment discussed under reference of FIG. 2 and the light source 2 of the embodiment as discussed under reference of FIG. 1, the image sensor 4' of the embodiment as discussed under reference of FIG. 2 and a circuitry 20-3.

Accordingly, the iToF system 10-3 combines a spot iToF system and a full-field iToF system in one iToF system which can switch between the two methods and, thus, combines advantages of both systems.

Returning again to the general explanations, it has been recognized that in spot iToF systems a measured spot peak pixel value in the spot pixel regions (e.g. highest signal intensity in the spot pixel region) may be higher than a peak pixel value in full-field iToF systems due to the concentration of the emitted light in the light spots. This may result in a higher signal quality (signal-to-noise ratio (SNR)) for objects located at a large distance from the light source, however, it may cause a saturation of the spot peak pixel value for objects at a close distance to the light source (and for objects with high reflectivity), which is generally known to the skilled person.

Generally, it is known to change an integration time adapted to an object, when, for instance, some depth information at specific object areas may be difficult to obtain due to too short exposure (which may increase noise) or too long exposure (which may saturation). However, for capturing depth information of the whole scene, this may require capturing several images with different integration times, which may increase acquisition time.

Moreover, it is known to discard some spot pixel regions that have a saturated spot peak pixel value, since the depth information may be determined based on the spot peak pixel value in the spot pixel region. Thus, if it is saturated these spot pixel regions may be discarded from image processing and depth calculation.

However, it has been recognized that, in addition to saturated spot peak pixels in the spot pixel regions and valley pixels in the valley pixel regions, also non-saturated pixels in the spot pixel regions are present. In other words, in some embodiments, in the spot pixel regions, pixels with spot pixel values ranging from low signal to saturation are present which may correspond to a short, middle and high integration time.

Thus, it has been recognized that a dynamic range of spot iToF system image data is high and that this information should be utilized for determining the depth information in spot pixel regions.

Hence, it has been further recognized that for spot pixel regions having a spot peak pixel value that is saturated, non-saturated pixels in the spot pixel regions should be used for determining the depth information for the spot pixel region instead of discarding the spot pixel region due to saturation of the spot peak pixel value.

Consequently, some embodiments pertain to an image processing circuitry for a time-of-flight system configured to:

generate, based on obtained image data of a plurality of pixels representing a time-of-flight measurement of light reflected from a scene that is illuminated with spotted light, corresponding component data including component values of the plurality of pixels;

calculate, based on the generated component data, corresponding phase amplitude image data including phase amplitude values of the plurality of pixels;

determine, based on the calculated phase amplitude image data, spot pixel regions and a valley pixel region among the plurality of pixels;

determine, in each of the spot pixel regions, a spot peak pixel having a maximum phase amplitude value among the phase amplitude values of the respective spot pixel region;

determine a first set of spot pixel regions, wherein the first set of spot pixel regions includes such spot pixel regions in which the determined maximum phase amplitude value of the spot peak pixel is above a predetermined threshold;

determine, in each of the spot pixel regions in the first set of spot pixel regions, a predetermined number of non-saturated pixels or non-saturated pixels in a predetermined range centered at the spot peak pixel which have a phase amplitude value below the predetermined threshold; and calculate a depth value for each of the spot pixel regions in the first set of spot pixel regions based on component values of the predetermined number of non-saturated pixels.

The image processing circuitry may be included or may be part of the ToF system. The image processing circuitry may be embedded in a control unit or processing unit included in the time-of-flight (ToF) system.

The image processing circuitry may be based on or may include or may be implemented by typical electronic components configured to achieve the functionality as described herein.

The image processing circuitry may be based on or may include or may be implemented as integrated circuitry logic and the functionality may be implemented by software executed by a processor or the like. The image processing circuitry may be based on or may include or may be implemented by a CPU (central processing unit), a microcontroller, an FPGA (field programmable gate array), an ASIC (application specific integrated circuit) or the like.

The image processing circuitry may be based on or may include or may be implemented in parts by typical electronic components and integrated circuitry logic and in parts by software.

The ToF system may be an iToF system including a spot iToF system.

The spot iToF system includes at least a light source, optical elements, an image sensor, a control unit for controlling the overall operation of the (spot) iToF system and the image processing circuitry.

The light source may be a laser (e.g. a laser diode) or a plurality of lasers (e.g. a plurality of laser diodes arranged in rows and columns), a light emitting diode (LED) or a plurality of LEDs (e.g. a plurality of LEDs arranged in rows and columns), or the like. The light source may emit visible light or infrared red, or the like.

The light source is configured to modulate an intensity of the emitted light (in time) according to a modulation signal, for example, a sinusoidal modulation signal with a predetermined frequency, a rectangular modulation signal with a predetermined frequency (e.g. the emitted light is turned on for a first predetermined time period, then turned off for a second predetermined time period and so) or the like, as generally known.

The optical elements may include optical lenses, optical filters, diffractive optical elements, etc. for imaging the emitted light onto a scene and for imaging reflected light from the scene onto the image sensor.

The emitted light towards the scene (which may include objects reflecting at least a part of the emitted light) is spotted light (or spatially modulated light), which is light having a spatial light pattern including high-intensity areas and low-intensity areas such as a plurality of light spots (or dots), stripes or the like. The spotted light (the spatial light pattern) may be achieved by the light source (e.g. by an array of laser diodes or LEDs) or by a combination of the light source and a diffractive optical element or the like, as generally known.

The image sensor generates image data of a plurality of pixels representing a ToF measurement of light reflected from the scene that is illuminated with the spotted light.

The image sensor may include a pixel circuitry (control unit, timing unit, driving units, signal processing, etc.) having the plurality of pixels (arranged according to a predetermined pattern, e.g., in rows and columns in the image sensor) generating an electric signal in accordance with an amount of light incident onto each of the plurality of pixels and in accordance with a demodulation signal which modulates, for example, a gain of the plurality of pixels, wherein the demodulation signal corresponds to the modulation signal of the light source. The demodulation signal for the image sensor may be phase-shifted with respect to the modulation signal of the light source, as generally known for ToF systems.

In some embodiments, the image sensor is a stacked image sensor including pixel circuitry and the image processing circuitry arranged on each other. In such embodiments, for example, the pixel circuitry is provided on a first semiconductor section and the processing circuitry (and logic circuitry) on a second semiconductor section, wherein the first and the second semiconductor section are electrically connected.

The plurality of pixels may be current assisted photonic demodulator (CAPD) pixels, photodiode pixels or active pixels based on, for example, CMOS (complementary metal oxide semiconductor) technology etc., wherein, for example, a gain of the plurality of pixels is modulated based on the demodulation signal.

The plurality of pixels may be multi-phase pixels, wherein each multi-phase pixel may include, for example, four subpixel areas (e.g. CAPD subpixel areas) which are demodulated with four different demodulation signals (e.g. phase-shifted with 0°, 90°, 180° and 270° with respect to the modulation signal of the light source).

The image sensor outputs image data to a memory or to the image processing circuitry.

The image data is obtained from the memory or the image sensor. The image data may be based on or may include digital values (pixel values) obtained from an analog signal (electric signal, e.g., a voltage or current signal) generated by the plurality of pixels in accordance with the amount of light incident onto each of the plurality of pixels and in accordance with the demodulation signal.

The image data includes pixel values of the plurality of pixels corresponding to at least two sets of pixel values of the plurality of pixels obtained for different demodulation signals with respect to a phase-shift of the demodulation signals. For example, a first demodulation signal may have a phase-shift of 0° with respect to the modulation signal of the light source and a second demodulation signal may have a phase-shift of 90° with respect to the modulation signal of the light source.

In some embodiments, the image data includes pixel values of the plurality of pixels corresponding to four different demodulation signals having a phase-shift 0°, 90°, 180° and 270°, respectively, with respect to the modulation signal of the light source. Of course, the present disclosure is neither limited to the number of phase shifts, i.e. demodulation signals, nor limited to the specific amounts of phase-shifts, but, in principle, any number of phase-shifts and any amount of phase-shift can be realized.

Hence, the image data may include image data of a plurality of frames. For example, the image data may include pixel values of the plurality of pixels of four frames, wherein a first frame corresponds to a demodulation signal having a phase-shift of 0° with respect to the modulation signal of the light source, a second frame corresponds to a demodulation signal having a phase-shift of 90° with respect to the modulation signal of the light source, a third frame corresponds to a demodulation signal having a phase-shift of 180° with respect to the modulation signal of the light source and a fourth frame corresponds to a demodulation signal having a phase-shift of 270° with respect to the modulation signal of the light source.

Alternatively, the image data may include image data of a one frame. For example, a multi-phase sensor may output image data for each of the pixel areas including pixel values corresponding to different demodulation signals (e.g. phase-shifted with 0°, 90°, 180° and 270° with respect to the modulation signal of the light source).

The image processing circuitry generates, based on the obtained image of the plurality of pixels, corresponding component data including component values of the plurality of pixels.

The component values include an in-phase component value (typically denoted with "I", as generally known) and a quadrature component value (typically denoted with "Q", as generally known) for each of the plurality of pixels.

A calculation of these component values in indirect ToF is generally known to the skilled person and is also indicated further below.

As generally known, the calculation of component values and a calculation of a depth value based on the component values may increase its accuracy, since contributions from background (ambient) light, pixel reset offsets, etc. may be reduced.

Figure 4:
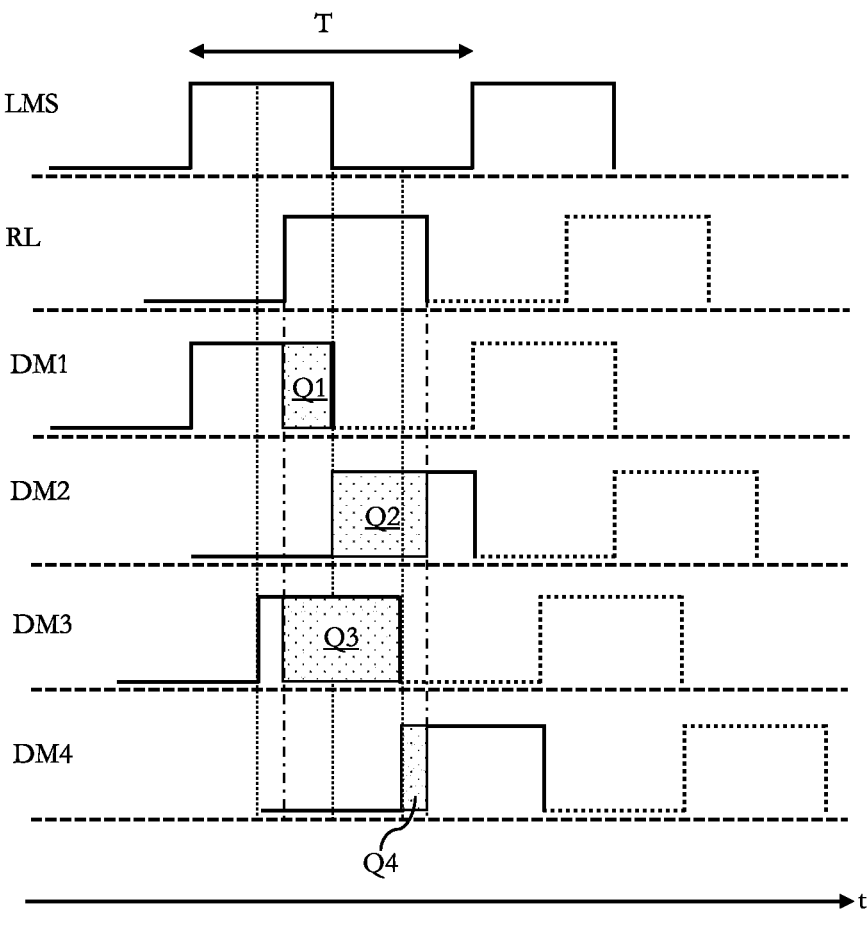
FIG. 4 schematically illustrates an embodiment of a modulation signal of a light source, a reflected light signal and four demodulation signals.
Figure 5:
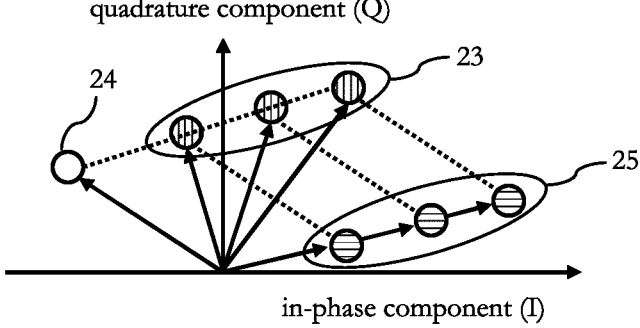
FIG. 5 schematically illustrates an embodiment of in-phase component values and quadrature component values.

For enhancing the general understanding of the present disclosure, the underlying principle of the component values is discussed under reference of FIG. 4 and FIG. 5, wherein FIG. 4 schematically illustrates an embodiment of a modulation signal of a light source, a reflected light signal and four demodulation signals, and wherein FIG. 5 schematically illustrates in-phase component values and quadrature component values. The following explanation is generally applicable in the present disclosure also to other embodiments.

FIG. 4 schematically illustrates an embodiment of a modulation signal LMS of a light source of an iToF system, a reflected light signal RL and four demodulation signals DM1-DM4.

The modulation signal LMS of the light source (e.g. the light source 11 of the iToF system 10 of the embodiment as discussed under reference of FIG. 2) is a rectangular modulation signal with a modulation period T. An intensity of emitted light of the light source is modulated in time according to the modulation signal LMS. The emitted light is reflected at an object in a scene.

The reflected light signal RL is an intensity of the reflected light at an image sensor (e.g. the image sensor 4' of the iToF system 10 of the embodiment as discussed under reference of FIG. 2), which is phase-shifted with respect to the modulation signal LMS and varies according to the intensity-modulation of the emitted light. The phase is proportional to a distance to the object in the scene.

The image sensor captures four frames corresponding to the demodulation signals DM1, DM2, DM3 and DM4.

The demodulation signal DM1 is phase-shifted by 0° with respect to the modulation signal LMS. When the demodulation signal DM1 is high, the image sensor (each of the plurality of pixels) accumulates an electrical charge Q1 in accordance with an amount of light incident on the respective pixel and an overlap of the reflected light signal RL and the demodulation signal DM1.

The demodulation signal DM2 is phase-shifted by 90° with respect to the modulation signal LMS. When the demodulation signal DM2 is high, the image sensor (each of the plurality of pixels) accumulates an electrical charge Q2 in accordance with an amount of light incident on the respective pixel and an overlap of the reflected light signal RL and the demodulation signal DM2.

The demodulation signal DM3 is phase-shifted by 180° with respect to the modulation signal LMS. When the demodulation signal DM3 is high, the image sensor (each of the plurality of pixels) accumulates an electrical charge Q3 in accordance with an amount of light incident on the respective pixel and an overlap of the reflected light signal RL and the demodulation signal DM3.

The demodulation signal DM4 is phase-shifted by 270° with respect to the modulation signal LMS. When the demodulation signal DM4 is high, the image sensor (each of the plurality of pixels) accumulates an electrical charge Q4 in accordance with an amount of light incident on the respective pixel and an overlap of the reflected light signal RL and the demodulation signal DM4.

The electrical charges Q1, Q2, Q3 and Q4, as generally known, are proportional to, e.g., a voltage signal (electric signal) of the respective pixel from which the pixel values are obtained and output by the image sensor and, thus, the electrical charges Q1, Q2, Q3 and Q4 are representative for the pixel values.

Then, the phase is given by:

$$\text{phase} = \arctan\left(\frac{Q3 - Q4}{Q1 - Q2}\right) = \arctan\left(\frac{Q}{I}\right),$$

$$Q = Q3 - Q4,$$

$$I = Q1 - Q2.$$

Here, Q is the quadrature component and I is the in-phase component, which are together the component values of a pixel (IQ value).

Then, the distance d to the object is given by:

$$d = \frac{1}{2\pi} \cdot \text{range} \cdot \text{phase}.$$

The amplitude of the light reflected signal RL is proportional to the phase amplitude value, wherein the phase amplitude value (amplitude) is given by:

$$\text{amplitude} = \sqrt{I^2 + Q^2}.$$

FIG. 5 schematically illustrates in-phase component values and quadrature component values.

Generally, the IQ values may be displayed in a coordinate system having the in-phase component I on the horizontal axis and the quadrature component Q on the vertical axis.

In FIG. 5 three spot pixel region IQ values 23 of three pixels in a spot pixel region are displayed in the coordinate system.

Each of the spot pixel region IQ values 23 has a different phase, which is given by the angle of the arrow from the origin of coordinates to the respective IQ value, even though they belong to the same spot pixel region.

A valley pixel region IQ value 24 is displayed in the coordinate system, wherein the valley pixel region IQ value 24 is a component value of a valley region pixel in the vicinity of the spot pixel region with the spot pixel region IQ values 23 (vicinity may be that a number of pixels between the valley pixel and the spot pixel region is equal or smaller than a number of pixels between the valley pixel and another spot pixel region).

Here, the amplitude of the valley pixel region IQ value 24 (phase amplitude value), which is given by the length of the arrow from the origin of coordinates to the respective IQ value, is comparable to the phase amplitude value of the spot pixel region IQ values 23 and, thus, multipath interference is high.

The phase of the spot pixel region IQ values 23 may be corrected (or accuracy may be improved by subtracting the valley pixel region IQ value 24 from the spot pixel region IQ values 23, thereby corrected spot pixel region IQ values 25 are obtained. The corrected spot pixel region IQ values 25 may then have the same phase.

Returning to the general explanations, the image processing circuitry calculates, based on the generated component data, corresponding phase amplitude image data including phase amplitude values of the plurality of pixels.

The phase amplitude values of each pixel of the plurality of pixels is the amplitude of the component values, as discussed above.

Moreover, as discussed herein, the amplitude of the component values of each pixel of the plurality of pixels is proportional to the light intensity incident onto the respective pixel and, thus, proportional to the pixel value of the respective pixel.

Accordingly, a spatial profile of the phase amplitude values (spatial phase amplitude profile) is proportional to the spatial pixel value profile which may correspond to the spatial light intensity profile of the plurality of light spots, as discussed under reference of FIG. 2.

The image processing circuitry determines, based on the calculated phase amplitude image data, spot pixel regions and a valley pixel region among the plurality of pixels.

As discussed above under reference of FIG. 2, a spot pixel region may include some pixels which are adjacent to each other and which may have, along a spatial dimension (e.g. a pixel coordinate such as a column coordinate in a pixel array), a spatial pixel value profile (in the obtained image data) corresponding the spatial light intensity profile of the plurality of light spots. Thus, as the spatial phase amplitude profile is proportional to the spatial pixel value profile, the spot pixel regions can be determined based on the phase amplitude values.

Accordingly, the valley region may include the other pixels which are not included in the spot pixel regions.

In some embodiments, the spot pixel regions are determined by applying a local maximum filter on the calculated phase amplitude image data.

The local maximum filter, which is generally known to the skilled person, determines the pixels among the plurality of pixels which have a phase amplitude value corresponding to a local maximum (spot peak pixels). Moreover, as the spatial light intensity profile of the plurality of light spots is known, the spatial phase amplitude profile is basically known (or a principle shape of the spatial phase amplitude profile, since it may be deformed in a case of saturation) and, thus, pixels which correspond to the spot pixel regions are determined by applying the local maximum filter. Hence, also a pixel range of the spot pixel region is obtained, wherein the pixel range is or includes, for example, a number of pixels which belong to the spot pixel region.

Hence, the image processing circuitry determines, in each of the spot pixel regions, a spot peak pixel having a maximum phase amplitude value among the phase amplitude values of the respective spot pixel region.

The image processing circuitry determines a first set of spot pixel regions, wherein the first set of spot pixel regions includes such spot pixel regions in which the determined maximum phase amplitude value is above a predetermined threshold.

In other words, the image processing circuitry determines a subset of spot pixel regions which include at least one saturated pixel.

In some embodiments, the predetermined threshold is based on at least a linearity of a light response curve of the plurality of pixels.

The light response curve of the plurality of pixels may not be linear for pixel values (and thus for phase amplitude values) which are dose to the maximum of the available bit range. In other words, the pixel light response may be non-linear above a certain light intensity on the pixel.

Hence, the predetermined threshold accounts for the non-linearity of the pixel light response and is an upper boundary for pixel values (and thus for phase amplitude values) in the linear regime of the light response curve and, thus, pixels having a phase amplitude values above the predetermined threshold are considered as saturated pixels.

The image processing circuitry determines, in each of the spot pixel regions in the first set of spot pixel regions, a predetermined number of non-saturated pixels or non-saturated pixels in a predetermined range centered at the spot peak pixel which have a phase amplitude value below the predetermined threshold.

The predetermined number of non-saturated pixels may be, for example, pixels corresponding to a slope of the spatial phase amplitude profile which may have a less direct contribution from the reflected light and, thus, may be comparable to a short integration time.

The predetermined range centered at the spot peak pixel may be, for example, a number of pixels adjacent to the spot peak pixel and, thus, pixels with less direct contribution from the reflected light in the vicinity of the spot peak pixel are determined which may be comparable to a short integration time.

Hence, utilizing such non-saturated pixels may circumvent an acquisition with different integration times for obtaining a depth value for saturated spot pixel regions.

The image processing circuitry calculates a depth value for each of the spot pixel regions in the first set of spot pixel regions based on component values of the predetermined number of non-saturated pixels.

As discussed above, the component values allow determining the phase of the reflected light which is proportional to the distance to or depth value of a corresponding object (or part of an object).

Generally, those non-saturated pixels at the slope may have less direct contribution from the reflected light and, thus, computing a depth value from those pixels may cause a lower depth SNR. However, as slope pixels may be in the vicinity of the saturated spot peak pixels, a signal level may be high enough (or nearly saturated) and, thus, depth SNR of those pixels may not have an impact on the accuracy of the depth value.

Accordingly, an extended dynamic range may be obtained by utilizing non-saturated pixels in saturated spot pixel regions, since, on the hand, a high sensitivity may be kept for low signal level areas and, on the other hand, high signal level areas may be processed despite partial saturation.

The extended dynamic range may be defined as the intensity ratio between spot peak pixel phase amplitude value and (slope) non-saturated pixel phase amplitude values (and it may depend on the spatial light intensity profile of the plurality of light spots). If a contrast of spot peak pixel phase amplitude value and (bottom) non-saturated pixel phase amplitude values is higher, the extended dynamic range may be wider.

Accordingly, at least one of the following may be achieved in some embodiments by utilizing non-saturated pixels in saturated spot pixel regions:

First, extending dynamic range and, thus, depth information acquisition at both far and close objects or high and low reflectivity objects at the same time may be achieved.

Second, as both information is computed from a single acquisition, there may be no impact on the acquisition time. In other words, the extended dynamic range may be achieved without acquiring image data at different integration times.

In addition, third, a change of acquisition method including camera hardware and camera configuration may not be required.

As discussed above, in some embodiments, the spot pixel regions are determined by applying a local maximum filter on the calculated phase amplitude image data.

However, in such embodiments, a center off the spot pixel region in the first set of spot pixel regions may not be determined accurately, for example, for spatial phase amplitude profiles which are skewed and deformed from a principle shape due to saturation. This may result in an inaccurate determination of the center and, thus, may result in a pixel offset.

Hence, in some embodiments, the image processing circuitry is further configured to:

correlate the calculated phase amplitude image data with a Gaussian kernel to obtain Gaussian correlated phase amplitude image data including correlated phase amplitude values of the plurality of pixels;

apply a local maximum filter on the Gaussian correlated phase amplitude image data to determine the spot pixel regions; and determine the spot peak pixel and the predetermined number of non-saturated pixels or the non-saturated pixels in a predetermined range centered at the spot peak pixel based on the correlated phase amplitude values.

The correlation may be a mathematical correlation or convolution or the like. The Gaussian kernel is or includes a (two-dimensional) Gaussian function (accordingly the Gaussian kernel or a different kernel has two spatial dimensions in accordance with the pixel coordinates or polar coordinates derived from the pixel coordinates and one amplitude dimension).

In some embodiments, the Gaussian kernel is replaced with a different kernel such as a Lorentzian kernel, Voigt kernel, elliptical kernel, etc. In such embodiments, the kernel selection may depend on the spatial light intensity profile of the plurality of light spots.

The center of the dot pixel region (and the spot pixel region itself) may be determined more accurately when the local maxima filter is applied on the Gaussian correlated phase amplitude image data.

In some embodiments, the image processing circuitry is further configured to:

apply a local maximum filter on the calculated phase amplitude image data to estimate the spot pixel regions;

correlate the calculated phase amplitude image data with a Gaussian kernel to obtain Gaussian correlated phase amplitude image data including correlated phase amplitude values of the plurality of pixels, wherein a kernel size of the Gaussian kernel is based on a pixel range of the estimated spot pixel regions;

apply a local maximum filter on the Gaussian correlated phase amplitude image data to determine the spot pixel regions; and determine the spot peak pixel and the predetermined number of non-saturated pixels or the non-saturated pixels in a predetermined range centered at the spot peak pixel based on the correlated phase amplitude values.

As discussed above, for skewed and deformed (distorted) spatial phase amplitude profiles of a spot pixel region, the local maxima filter may only provide an estimate of the spot pixel region.

However, the estimate of the spot pixel region provides a pixel range of the spot pixel region, which is used, in some embodiments, to adapt a kernel size of the Gaussian kernel.

In some embodiments, the kernel size of the Gaussian kernel is larger than the pixel range of the estimated spot pixel regions.

A larger kernel size may allow to have more non-saturated pixels on the slope of the spatial phase amplitude profile, since a tolerance for saturation is higher with larger kernel size.

Additionally, in some embodiments, an (spatial) amplitude profile of the kernel (Gaussian, Lorentzian, etc.) is adapted to match the (spatial) phase amplitude profile for computing the correlation. For example, the kernel amplitude profile may be asymmetric to adapt to an asymmetric or skewed (spatial) phase amplitude profile. For example, the kernel amplitude profile may be a superposition of more than one kernels to adapt to (spatial) phase amplitude profiles with more than one peak.

In some embodiments, the image processing circuitry is further configured to:

calculate a score map based on a learned magnitude relation of phase amplitude values of pixel pairs, wherein the spot pixel regions are determined by local extrema of the score map.

The spatial phase amplitude profile may include more than one local maximum close to each other in a spot pixel region due to saturation. The magnitude relation of the corresponding phase amplitude values of pixel pairs (neighboring pixels or close pixels) may be learned empirically (e.g. by a machine learning algorithm) and, thus, each pixel pair may be assigned a weight. Hence, summing up the weights for all pixel pairs, a score map is generated. In such a score map the local extrema may correspond to the center of the spot pixel regions, thereby determining the spot pixel regions.

In some embodiments, the image processing circuitry is further configured to:

determine a second set of spot pixel regions, wherein the second set of spot pixel regions includes such spot pixel regions in which the determined maximum phase amplitude value of the spot peak pixel is below the predetermined threshold; and calculate a depth value for each of the spot pixel regions in the second set of spot pixel regions based on component values of the respective spot peak pixel.

Accordingly, if a spot pixel region is not saturated, the depth value for those spot pixel regions is calculated based on the component values (IQ value) of the spot peak pixel which has the maximum phase amplitude value.

In some embodiments, the image processing circuitry is further configured to:

remove, from the first set of spot pixel regions and the second set of spot pixel regions, such spot pixel regions in which a phase amplitude value of at least one valley pixel in the valley pixel region is above the predetermined threshold, wherein the at least one valley pixel is located in the vicinity of the respective spot pixel region.

In such embodiments, the background light and multipath interference is typically large, which may lead to an almost complete saturation of some pixel areas of the image sensor and, thus, those spot pixel regions may not be determined accurately and should therefore not be processed.

In some embodiments, the image processing circuitry is further configured to:

remove, from the first set of spot pixel regions, such spot pixel regions in which the total number of non-saturated pixels is below the predetermined number of non-saturated pixels.

In such embodiments, the respective spot pixel regions are typically saturated over a large pixel range (compared to the overall pixel range of the spot pixel region) and only few non-saturated pixels may be available. This may lead to an undesired large noise and may cause higher depth noise and, thus, those spot pixel regions should not be processed.

In some embodiments, the image processing circuitry is further configured to:

calculate the depth value for each of the spot pixel regions in the first set of spot pixel regions and the depth value for each of the spot pixel regions in the second set of spot pixel regions based on component values of at least one valley pixel in the valley pixel region, wherein the at least one valley pixel is located in the vicinity of the respective spot pixel region.

As discussed under reference of FIG. 5, in a case in which the phase amplitude value of a valley pixel in the vicinity of the spot pixel region is comparable to the phase amplitude values of the spot pixel region, a subtraction of the component values of the valley pixel from the component values used for depth calculation may improve the accuracy of the depth value.

Some embodiments pertain to an image processing method for a time-of-flight system including (the following features correspond to the features discussed for the image processing circuitry for a time-of-flight system discussed herein and, thus, the explications apply mutatis mutandis to the method):

generating, based on obtained image data of a plurality of pixels representing a time-of-flight measurement of light reflected from a scene that is illuminated with spotted light, corresponding component data including component values of the plurality of pixels;

calculating, based on the generated component data, corresponding phase amplitude image data including phase amplitude values of the plurality of pixels;

determining, based on the calculated phase amplitude image data, spot pixel regions and a valley pixel region among the plurality of pixels;

determining, in each of the spot pixel regions, a spot peak pixel having a maximum phase amplitude value among the phase amplitude values of the respective spot pixel region;

determining a first set of spot pixel regions, wherein the first set of spot pixel regions includes such spot pixel regions in which the determined maximum phase amplitude value of the spot peak pixel is above a predetermined threshold;

determining, in each of the spot pixel regions in the first set of spot pixel regions, a predetermined number of non-saturated pixels or non-saturated pixels in a predetermined range centered at the spot peak pixel which have a phase amplitude value below the predetermined threshold; and calculating a depth value for each of the spot pixel regions in the first set of spot pixel regions based on component values of the predetermined number of non-saturated pixels.

The image processing method may be based on or may be implemented by electronic components, integrated circuitry logic, CPU, FPGA, software or in parts by electronic components and in parts by software executed by a processor or the like. The method may also be performed by the image processing circuitry, time of flight apparatus (system), etc., as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 6, an embodiment of spot pixel regions 31 and 32 and corresponding phase amplitude values 31-L1 and 32-L2 is schematically illustrated, which is discussed in the following, wherein the following explanation is generally applicable in the present disclosure also to other embodiments.

In the upper part of FIG. 6 phase amplitude image data 30 is schematically illustrated, wherein the phase amplitude image data includes phase amplitude values as a Z-coordinate for each pixel of the plurality of pixels, wherein a certain pixel is identified by its pixel coordinates X and Y.

In the phase amplitude image data 30 spot pixel regions 31 and 32 are determined and a valley pixel region 33 is determined by applying a local maxima filter, as discussed herein.

The spot pixel regions 31 are non-saturated spot pixel regions and the spot pixel regions 32 are saturated spot pixel regions.

In the lower part of FIG. 6 phase amplitude values 31-L1 along a line L1 of a non-saturated spot pixel region 31 and at least one valley pixel 33-L1 in the vicinity of the non-saturated spot pixel region 31 are schematically illustrated.

Moreover, in the lower part of FIG. 6 phase amplitude values 32-L2 along a line L2 of a saturated spot pixel region 32 and at least one valley pixel 33-L2 in the vicinity of the saturated spot pixel region 32 are schematically illustrated.

The dotted lines in the lower part of FIG. 6 illustrate the pixel range or the boundaries of the determined spot pixel regions.

The phase amplitude values 31-L1 of the non-saturated spot pixel region 31 are below a predetermined threshold Zth.

A spot peak pixel having a maximum phase amplitude value 34 in the non-saturated spot pixel region 31 is determined almost at a center of the non-saturated spot pixel region 31 (the middle between the dotted boundaries).

As the determined maximum phase amplitude value 34 of the spot peak pixel is below the predetermined threshold Zth, a depth value for the non-saturated spot pixel region 31 is calculated based on corresponding component values of the spot peak pixel. The depth value may further be calculated based on the at least one valley pixel 33-L1 in the vicinity of the non-saturated spot pixel region 31.

A part of the phase amplitude values 32-L2 of the saturated spot pixel region 32 are above the predetermined threshold Zth.

A spot peak pixel having a maximum phase amplitude value 35 in the saturated spot pixel region 32 is determined off a center of the saturated spot pixel region 32.

As the determined maximum phase amplitude value 35 of the spot peak pixel is above the predetermined threshold Zth, non-saturated pixels 36 at the slope of the spatial phase amplitude profile represented by the phase amplitude values 32-L2 are used for calculating a depth value for the saturated spot pixel region 32. The depth value is calculated based on the component values of the non-saturated pixels 36. The depth value may further be calculated based on the at least one valley pixel 33-L2 in the vicinity of the saturated spot pixel region 32.

However, the determined spot peak pixel is not at the center of the saturated spot pixel region 32, which causes a pixel offset (position offset) of the depth value of an object.

Moreover, the phase amplitude values 32-L2 of the saturated spot pixel region 32 includes pixels 37*a* and 37*b* which are close above the predetermined threshold due to the saturation, however, these pixels 37*a* and 37*b* may actually be non-saturated if the shape of the spatial phase amplitude profile would not be distorted due to a saturation artifact. This is discussed in the following under reference of FIG. 7.

Figure 7:
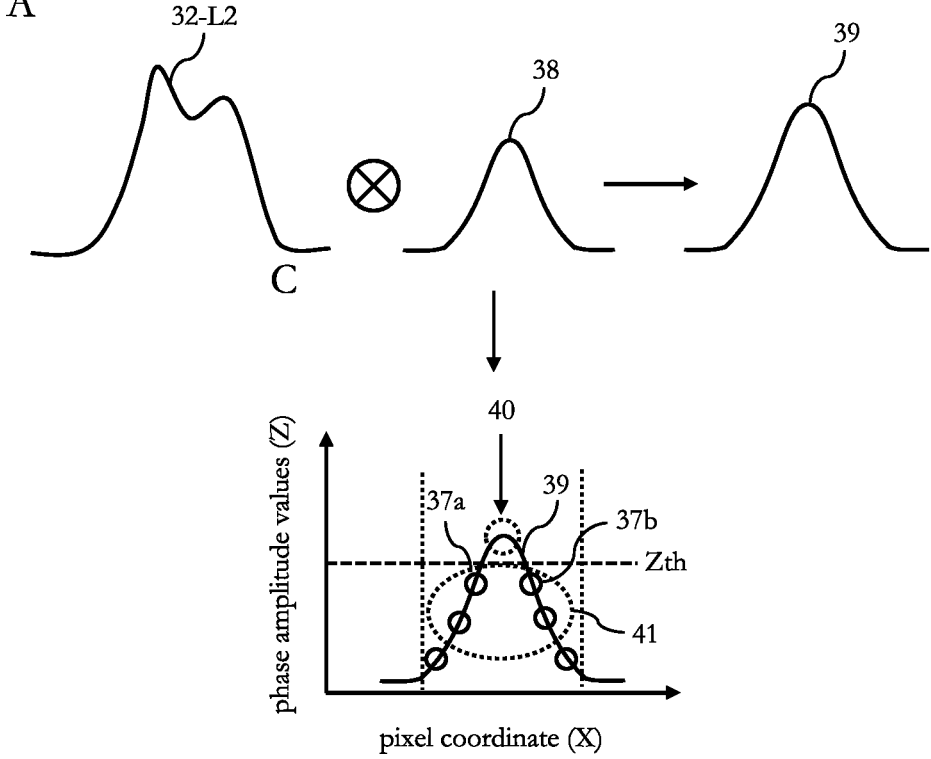
FIG. 7 schematically illustrates an embodiment of Gaussian correlated phase amplitude values for determining a spot pixel region.
Figure 7:
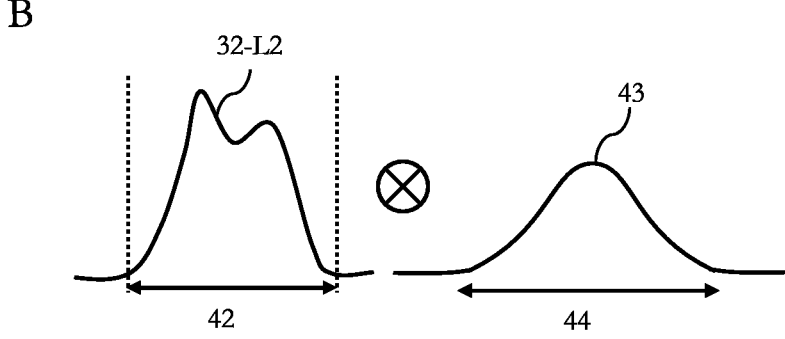

FIG. 7 schematically illustrates an embodiment of Gaussian correlated phase amplitude values 39 for determining a spot pixel region, as is implemented in some embodiments of the present disclosure.

In FIG. 7A the phase amplitude values 32-L2 of the embodiment discussed under reference of FIG. 6 is correlated with a Gaussian kernel 38 to obtain the Gaussian correlated phase amplitude values 39, wherein the phase amplitude values 32-L2 are only exemplarily, since the whole phase amplitude image data 30 is correlated with the Gaussian kernel 38 to obtain Gaussian correlated phase amplitude data. Then, a local maxima filter is applied on the Gaussian correlated phase amplitude data to determine the spot pixel regions.

The Gaussian kernel 38 is representative for a principle spatial shape of detection signals on the image sensor and, thus, correlating the phase amplitude values 32-L2 with the Gaussian kernel 38 may allow determining the center of the saturated spot pixel region and may increase the tolerance for saturation.

This is illustrated in the lower part of FIG. 7A.

A local maximum filter is applied on the Gaussian correlated phase amplitude values 39 to determine the saturated spot pixel region 32 illustrated by the dotted boundaries.

A spot peak pixel having a maximum phase amplitude value 40 is determined at a center of the saturated spot pixel region 32.

As the determined maximum phase amplitude value 40 of the spot peak pixel is above the predetermined threshold Zth, a predetermined number of non-saturated pixels 41 (here 4 of 6 for illustration purposes only) at the slope of the spatial phase amplitude profile represented by the Gaussian correlated phase amplitude values 39 are used for calculating a depth value for the saturated spot pixel region 32. The depth value is calculated based on the component values of the non-saturated pixels 41. The non-saturated pixels 41 include also the pixels 37a and 37b, which are actually non-saturated pixels.

In FIG. 7B the phase amplitude values 32-L2 of the saturated spot pixel region 32 of the embodiment discussed under reference of FIG. 6 is correlated with a Gaussian kernel 43 to obtain Gaussian correlated phase amplitude values.

The difference to FIG. 7A is that in FIG. 7A the phase amplitude image data 30 is correlated with a Gaussian kernel on which then a local maximum filter is applied to determine the spot pixel regions, while in FIG. 7B a local maxima filter is firstly applied to the phase amplitude image data 30 to estimate the spot pixel regions and then apply on each spot pixel regions an individual Gaussian kernel having an adapted kernel size to determine the spot pixel regions.

The estimated spot pixel region of the phase amplitude values 32-L2 has a pixel range 42, which is smaller than a kernel size 44 of the Gaussian kernel 43 and may increase the tolerance for saturation.

Figure 8:
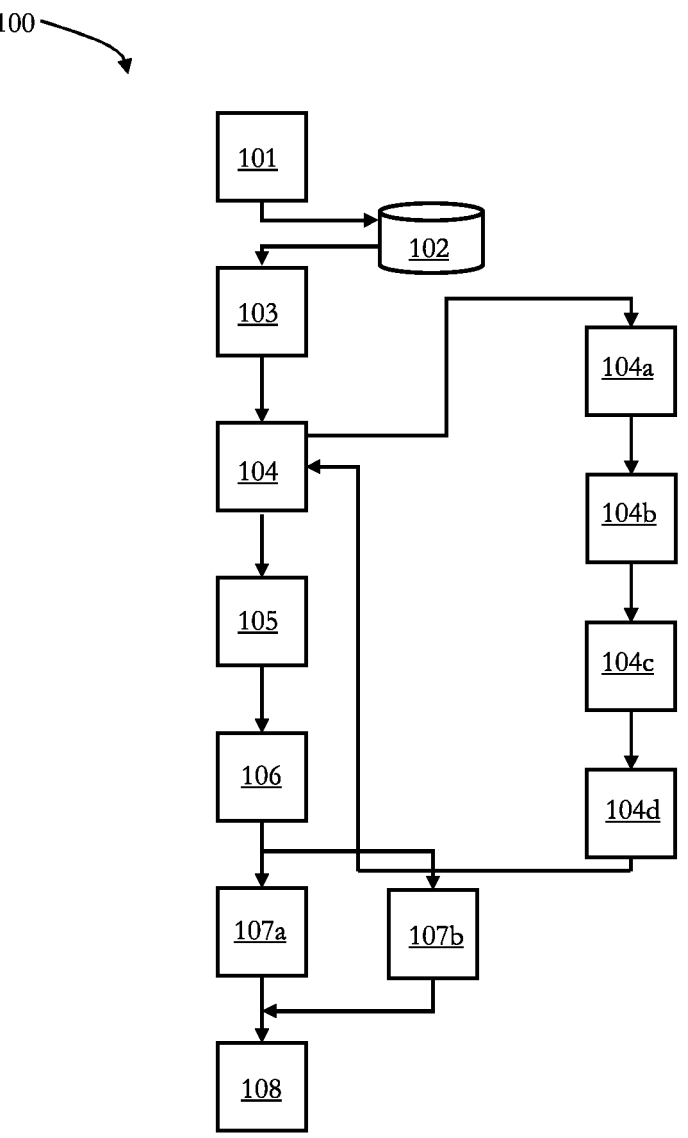
FIG. 8 schematically illustrates in a flow diagram a first embodiment of an image processing method.

FIG. 8 schematically illustrates in a flow diagram a first embodiment of an image processing method 100 (which may be, for example, implemented in a time-of-flight apparatus/system or circuitry according to the present disclosure).

At 101, image data of a plurality of pixels of an image sensor is generated from reflected light incident onto the image sensor, wherein the image data include image data of four frames corresponding to demodulation signals which are phase-shifted by 0°, 90°, 180° and 270° with respect to a modulation signal applied to the image sensor, as discussed herein.

At 102, the generated image data is stored on a memory.

At 103, based on the generated image data obtained from the memory, component data including component values are generated, as discussed herein.

At 104, the generated component data is processed.

At 104a, based on the generated component data, corresponding phase amplitude image data including phase amplitude values of the plurality of pixels is generated and the spot pixel regions and a valley pixel region among the plurality of pixels are determined based on the phase amplitude image data, as discussed herein.

At 104b, in each of the spot pixel regions, a spot peak pixel having a maximum phase amplitude value among the phase amplitude values of the respective spot pixel region is determined, as discussed herein.

Then, at 104b, a first set of spot pixel regions is determined, wherein the first set of spot pixel regions includes such spot pixel regions in which the determined maximum phase amplitude value of the spot peak pixel is above a predetermined threshold, as discussed herein.

Then, at 104b, in each of the spot pixel regions in the first set of spot pixel regions, a predetermined number of non-saturated pixels which have a phase amplitude value below the predetermined threshold is determined, as discussed herein.

Then, at 104b, from the first set of spot pixel regions such spot pixel regions in which the total number of non-saturated pixels is below the predetermined number of non-saturated pixels are removed, as discussed herein.

Moreover, at 104b, a second set of spot pixel regions, wherein the second set of spot pixel regions includes such spot pixel regions in which the determined maximum phase amplitude value of the spot peak pixel is below the predetermined threshold is determined, as discussed herein.

At 104c, from the first set of spot pixel regions and the second set of spot pixel regions such spot pixel regions in which a phase amplitude value of at least one valley pixel in the valley pixel region is above the predetermined threshold are removed, wherein the at least one valley pixel is located in the vicinity of the respective spot pixel region, as discussed herein.

At 104d, if a phase amplitude value of a valley pixel in the vicinity of a spot pixel region is comparable to the phase amplitude values of the spot pixel region, then subtract corresponding component values of the valley pixel from the component values of the spot peak pixel for the second of spot pixel regions and from the component values of the non-saturated pixels for the first set of spot pixel regions.

At 105, a phase value of the reflected light and a confidence value of the phase value for each of the spot pixel regions is calculated, wherein the confidence value is given by phase amplitude values, as generally known.

At 106, based on the confidence value for each of the spot pixel regions, a phase error correction is performed.

At 107a, based on the calculated phase, a (radial) depth value is calculated for each of the spot pixel regions.

At 107b, based on the calculated phase, a (cartesian) depth value is calculated for each of the spot pixel regions.

At 108, the depth values are output.

FIG. 9 schematically illustrates in a flow diagram a second embodiment of an image processing method 200 (which may be, for example, implemented in a time-of-flight apparatus/system or circuitry according to the present disclosure).

At 201, based on obtained image data of a plurality of pixels representing a time-of-flight measurement of light reflected from a scene that is illuminated with spotted light, corresponding component data including component values of the plurality of pixels is generated, as discussed herein.

At 202, based on the generated component data, corresponding phase amplitude image data including phase amplitude values of the plurality of pixels is calculated, as discussed herein.

At 203, based on the calculated phase amplitude image data, spot pixel regions and a valley pixel region among the plurality of pixels are determined, as discussed herein.

At 204, in each of the spot pixel regions, a spot peak pixel having a maximum phase amplitude value among the phase amplitude values of the respective spot pixel region is determined, as discussed herein.

At 205, a first set of spot pixel regions is determined, wherein the first set of spot pixel regions includes such spot pixel regions in which the determined maximum phase amplitude value of the spot peak pixel is above a predetermined threshold, as discussed herein.

At 206, in each of the spot pixel regions in the first set of spot pixel regions, a predetermined number of non-saturated pixels or non-saturated pixels in a predetermined range centered at the spot peak pixel which have a phase amplitude value below the predetermined threshold is/are determined, as discussed herein.

At 207, a depth value for each of the spot pixel regions in the first set of spot pixel regions based on component values of the predetermined number of non-saturated pixels is calculated, as discussed herein.

At 208, the calculated phase amplitude image data is correlated with a Gaussian kernel to obtain Gaussian correlated phase amplitude image data including correlated phase amplitude values of the plurality of pixels, as discussed herein.

At 209, a local maximum filter on the Gaussian correlated phase amplitude image data is applied to determine the spot pixel regions, as discussed herein.

At 210, the spot peak pixel and the predetermined number of non-saturated pixels or the non-saturated pixels in a predetermined range centered at the spot peak pixel based on the correlated phase amplitude values is/are determined, as discussed herein.

FIG. 10 schematically illustrates in a flow diagram a third embodiment of an image processing method 300 (which may be, for example, implemented in a time-of-flight apparatus/system or circuitry according to the present disclosure).

At 301, the steps 201 to 207 of the embodiment discussed under reference of FIG. 9 are performed (and are included here by incorporation of reference in order to avoid unnecessary repetitions).

At 302, a local maximum filter is applied on the calculated phase amplitude image data to estimate the spot pixel regions, as discussed herein.

At 303, the calculated phase amplitude image data is correlated with a Gaussian kernel to obtain Gaussian correlated phase amplitude image data including correlated phase amplitude values of the plurality of pixels, wherein a kernel size of the Gaussian kernel is based on a pixel range of the estimated spot pixel regions, as discussed herein.

At 304, the kernel size of the Gaussian kernel is selected to be larger than the pixel range of the estimated spot pixel regions, as discussed herein.

At 305, a local maximum filter is applied on the Gaussian correlated phase amplitude image data to determine the spot pixel regions, as discussed herein.

At 306, the spot peak pixel and the predetermined number of non-saturated pixels or the non-saturated pixels in a predetermined range centered at the spot peak pixel is/are determined based on the correlated phase amplitude values, as discussed herein.

FIG. 11 schematically illustrates in a flow diagram a fourth embodiment of an image processing method 400 (which may be, for example, implemented in a time-of-flight apparatus/system or circuitry according to the present disclosure).

At 401, the steps 201 to 207 of the embodiment discussed under reference of FIG. 9 are performed (and are incorporated by reference in order to avoid unnecessary repetitions).

At 402, a score map is calculated based on a learned magnitude relation of phase amplitude values of pixel pairs, wherein the spot pixel regions are determined by local extrema of the score map, as discussed herein.

FIG. 12 schematically illustrates in a flow diagram a fifth embodiment of an image processing method 500 (which may be, for example, implemented in a time-of-flight apparatus/system or circuitry according to the present disclosure).

At 501, the steps 201 to 207 of the embodiment discussed under reference of FIG. 9 are performed (and are incorporated by reference in order to avoid unnecessary repetitions).

At 502, a second set of spot pixel regions is determined, wherein the second set of spot pixel regions includes such spot pixel regions in which the determined maximum phase amplitude value of the spot peak pixel is below the predetermined threshold, as discussed herein, At 503, a depth value for each of the spot pixel regions in the second set of spot pixel regions based on component values of the respective spot peak pixel is calculated, as discussed herein.

At 504, from the first set of spot pixel regions and the second set of spot pixel regions, such spot pixel regions in which a phase amplitude value of at least one valley pixel in the valley pixel region is above the predetermined threshold are removed, wherein the at least one valley pixel is located in the vicinity of the respective spot pixel region, as discussed herein.

At 505, from the first set of spot pixel regions, such spot pixel regions in which the total number of non-saturated pixels is below the predetermined number of non-saturated pixels are removed, as discussed herein.

At 506, the depth value for each of the spot pixel regions in the first set of spot pixel regions and the depth value for each of the spot pixel regions in the second set of spot pixel regions is calculated based on component values of at least one valley pixel in the valley pixel region, wherein the at least one valley pixel is located in the vicinity of the respective spot pixel region, as discussed herein.

It should be recognized that the embodiments describe methods with an exemplary ordering of method steps. The specific ordering of method steps is however given for illustrative purposes only and should not be construed as binding.

Please note that the division of the control 12 into units 18 and 19 is only made for illustration purposes and that the present disclosure is not limited to any specific division of functions in specific units. For instance, the control 12 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so fax as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An image processing circuitry for a time-of-flight system configured to:

generate, based on obtained image data of a plurality of pixels representing a time-of-flight measurement of light reflected from a scene that is illuminated with spotted light, corresponding component data including component values of the plurality of pixels;

calculate, based on the generated component data, corresponding phase amplitude image data including phase amplitude values of the plurality of pixels;

determine, based on the calculated phase amplitude image data, spot pixel regions and a valley pixel region among the plurality of pixels;

determine, in each of the spot pixel regions, a spot peak pixel having a maximum phase amplitude value among the phase amplitude values of the respective spot pixel region;

determine a first set of spot pixel regions, wherein the first set of spot pixel regions includes such spot pixel regions in which the determined maximum phase amplitude value of the spot peak pixel is above a predetermined threshold;

determine, in each of the spot pixel regions in the first set of spot pixel regions, a predetermined number of non-saturated pixels or non-saturated pixels in a predetermined range centered at the spot peak pixel which have a phase amplitude value below the predetermined threshold; and calculate a depth value for each of the spot pixel regions in the first set of spot pixel regions based on component values of the predetermined number of non-saturated pixels.

(2) The image processing circuitry of (1), wherein the image processing circuitry is further configured to:

correlate the calculated phase amplitude image data with a Gaussian kernel to obtain Gaussian correlated phase amplitude image data including correlated phase amplitude values of the plurality of pixels;

apply a local maximum filter on the Gaussian correlated phase amplitude image data to determine the spot pixel regions; and determine the spot peak pixel and the predetermined number of non-saturated pixels or the non-saturated pixels in a predetermined range centered at the spot peak pixel based on the correlated phase amplitude values.

(3) The image processing circuitry of (1), wherein the image processing circuitry is further configured to:

apply a local maximum filter on the calculated phase amplitude image data to estimate the spot pixel regions;

correlate the calculated phase amplitude image data with a Gaussian kernel to obtain Gaussian correlated phase amplitude image data including correlated phase amplitude values of the plurality of pixels, wherein a kernel size of the Gaussian kernel is based on a pixel range of the estimated spot pixel regions;

apply a local maximum filter on the Gaussian correlated phase amplitude image data to determine the spot pixel regions; and determine the spot peak pixel and the predetermined number of non-saturated pixels or the non-saturated pixels in a predetermined range centered at the spot peak pixel based on the correlated phase amplitude values.

(4) The image processing circuitry of (3), wherein the kernel size of the Gaussian kernel is larger than the pixel range of the estimated spot pixel regions.

(5) The image processing circuitry of (1), wherein the image processing circuitry is further configured to:

calculate a score map based on a learned magnitude relation of phase amplitude values of pixel pairs, wherein the spot pixel regions are determined by local extrema of the score map.

(6) The image processing circuitry of anyone of (1) to (5), wherein the image processing circuitry is further configured to:

determine a second set of spot pixel regions, wherein the second set of spot pixel regions includes such spot pixel regions in which the determined maximum phase amplitude value of the spot peak pixel is below the predetermined threshold; and calculate a depth value for each of the spot pixel regions in the second set of spot pixel regions based on component values of the respective spot peak pixel.

(7) The image processing circuitry of anyone of (1) to (6), wherein the image processing circuitry is further configured to:

remove, from the first set of spot pixel regions and the second set of spot pixel regions, such spot pixel regions in which a phase amplitude value of at least one valley pixel in the valley pixel region is above the predeter-mined threshold, wherein the at least one valley pixel is located in the vicinity of the respective spot pixel region.

(8) The image processing circuitry of anyone of (1) to (7), wherein the image processing circuitry is further configured to:

remove, from the first set of spot pixel regions, such spot pixel regions in which the total number of non-saturated pixels is below the predetermined number of non-saturated pixels.

(9) The image processing circuitry of anyone of (6) to (8), wherein the image processing circuitry is further configured to:

calculate the depth value for each of the spot pixel regions in the first set of spot pixel regions and the depth value for each of the spot pixel regions in the second set of spot pixel regions based on component values of at least one valley pixel in the valley pixel region, wherein the at least one valley pixel is located in the vicinity of the respective spot pixel region.

(10) The image processing circuitry of anyone of (1) to (10), wherein the predetermined threshold is based on at least a linearity of a light response curve of the plurality of pixels.

(11) An image processing method for a time-of-flight system including:

generating, based on obtained image data of a plurality of pixels representing a time-of-flight measurement of light reflected from a scene that is illuminated with spotted light, corresponding component data including component values of the plurality of pixels;

calculating, based on the generated component data, corresponding phase amplitude image data including phase amplitude values of the plurality of pixels;

determining, based on the calculated phase amplitude image data, spot pixel regions and a valley pixel region among the plurality of pixels;

determining, in each of the spot pixel regions, a spot peak pixel having a maximum phase amplitude value among the phase amplitude values of the respective spot pixel region;

determining a first set of spot pixel regions, wherein the first set of spot pixel regions includes such spot pixel regions in which the determined maximum phase amplitude value of the spot peak pixel is above a predetermined threshold;

determining, in each of the spot pixel regions in the first set of spot pixel regions, a predetermined number of non-saturated pixels or non-saturated pixels in a predetermined range centered at the spot peak pixel which have a phase amplitude value below the predetermined threshold; and calculating a depth value for each of the spot pixel regions in the first set of spot pixel regions based on component values of the predetermined number of non-saturated pixels.

(12) The image processing method of (11), further including:

correlating the calculated phase amplitude image data with a Gaussian kernel to obtain Gaussian correlated phase amplitude image data including correlated phase amplitude values of the plurality of pixels;

applying a local maximum filter on the Gaussian correlated phase amplitude image data to determine the spot pixel regions; and determining the spot peak pixel and the predetermined number of non-saturated pixels or the non-saturated pixels in a predetermined range centered at the spot peak pixel based on the correlated phase amplitude values.

(13) The image processing method of (11), further including:

applying a local maximum filter on the calculated phase amplitude image data to estimate the spot pixel regions;

correlating the calculated phase amplitude image data with a Gaussian kernel to obtain Gaussian correlated phase amplitude image data including correlated phase amplitude values of the plurality of pixels, wherein a kernel size of the Gaussian kernel is based on a pixel range of the estimated spot pixel regions;

applying a local maximum filter on the Gaussian correlated phase amplitude image data to determine the spot pixel regions; and determining the spot peak pixel and the predetermined number of non-saturated pixels or the non-saturated pixels in a predetermined range centered at the spot peak pixel based on the correlated phase amplitude values.

(14) The image processing method of (13), further including:

selecting the kernel size of the Gaussian kernel to be larger than the pixel range of the estimated spot pixel regions.

(15) The image processing method of (11), further including:

calculating a score map based on a learned magnitude relation of phase amplitude values of pixel pairs, wherein the spot pixel regions are determined by local extrema of the score map.

(16) The image processing method of anyone of (11) to (15), further including:

determining a second set of spot pixel regions, wherein the second set of spot pixel regions includes such spot pixel regions in which the determined maximum phase amplitude value of the spot peak pixel is below the predetermined threshold; and calculating a depth value for each of the spot pixel regions in the second set of spot pixel regions based on component values of the respective spot peak pixel.

(17) The image processing method of anyone of (11) to (16), further including:

removing, from the first set of spot pixel regions and the second set of spot pixel regions, such spot pixel regions in which a phase amplitude value of at least one valley pixel in the valley pixel region is above the predetermined threshold, wherein the at least one valley pixel is located in the vicinity of the respective spot pixel region.

(18) The image processing method of anyone of (11) to (17), further including:

removing, from the first set of spot pixel regions, such spot pixel regions in which the total number of non-saturated pixels is below the predetermined number of non-saturated pixels.

(19) The image processing method of anyone of (16) to (18), further including:

calculating the depth value for each of the spot pixel regions in the first set of spot pixel regions and the depth value for each of the spot pixel regions in the second set of spot pixel regions based on component values of at least one valley pixel in the valley pixel region, wherein the at least one valley pixel is located in the vicinity of the respective spot pixel region.

(20) The image processing method of anyone of (11) to (19), wherein the predetermined threshold is based on at least a linearity of a light response curve of the plurality of pixels.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. Image processing circuitry comprising:

one or more processors; and memory storing instructions that, when executed by the one or more processors, cause the image processing circuitry to generate, based on obtained image data of a plurality of pixels representing a time-of-flight measurement of light reflected from a scene that is illuminated with spotted light, corresponding component data including component values of the plurality of pixels;

calculate, based on the generated component data, corresponding phase amplitude image data including phase amplitude values of the plurality of pixels;

determine, based on the calculated phase amplitude image data, spot pixel regions and a valley pixel region among the plurality of pixels;

determine, in each of the spot pixel regions, a spot peak pixel having a maximum phase amplitude value among the phase amplitude values of the respective spot pixel region;

determine a first set of spot pixel regions from among the spot pixel regions, wherein each spot pixel region in the first set has a spot peak level pixel with a maximum phase amplitude value that is above a predetermined threshold;

determine, in each of the spot pixel regions in the first set of spot pixel regions, a predetermined number of non-saturated pixels or non-saturated pixels in a predetermined range centered at the spot peak level pixel which have a phase amplitude value below the predetermined threshold; and calculate a depth value for each of the spot pixel regions in the first set of spot pixel regions based on component values of the predetermined number of non-saturated pixels.

2. The image processing circuitry according to claim 1, wherein the instructions further cause the image processing circuitry to:

correlate the calculated phase amplitude image data with a Gaussian kernel to obtain Gaussian correlated phase amplitude image data including correlated phase amplitude values of the plurality of pixels;

apply a local maximum filter on the Gaussian correlated phase amplitude image data to determine the spot pixel regions; and determine, for each of the spot pixel regions in the first set of spot pixel regions, a respective spot peak level pixel and the predetermined number of non-saturated pixels or the non-saturated pixels in a predetermined range centered at the spot peak level pixel based on the correlated phase amplitude values.

3. The image processing circuitry according to claim 1, wherein the instructions further cause the image processing circuitry to:

apply a local maximum filter on the calculated phase amplitude image data to estimate the spot pixel regions;

correlate the calculated phase amplitude image data with a Gaussian kernel to obtain Gaussian correlated phase amplitude image data including correlated phase amplitude values of the plurality of pixels, wherein a kernel size of the Gaussian kernel is based on a pixel range of the estimated spot pixel regions;

apply a local maximum filter on the Gaussian correlated phase amplitude image data to determine the spot pixel regions; and determine, for each of the spot pixel regions in the first set of spot pixel regions, a respective spot peak level pixel and the predetermined number of non-saturated pixels or the non-saturated pixels in a predetermined range centered at the spot peak level pixel based on the correlated phase amplitude values.

4. The image processing circuitry according to claim 3, wherein the kernel size of the Gaussian kernel is larger than the pixel range of the estimated spot pixel regions.

5. The image processing circuitry according to claim 1, wherein the instructions further cause the image processing circuitry to:

calculate a score map based on a learned magnitude relation of phase amplitude values of pixel pairs, wherein the spot pixel regions are determined by local extrema of the score map.

6. The image processing circuitry according to claim 1, wherein the instructions further cause the image processing circuitry to:

determine a second set of spot pixel regions from among the spot pixel regions, wherein each spot pixel region in the second set has a spot peak pixel with a maximum phase amplitude value that is below the predetermined threshold; and calculate a depth value for each spot pixel region in the second set based on component values of the respective spot peak pixel.

7. The image processing circuitry according to claim 6, wherein the instructions further cause the image processing circuitry to:

remove, from the first set of spot pixel regions and the second set of spot pixel regions, spot pixel regions in which a phase amplitude value of at least one valley pixel in the valley pixel region is above the predetermined threshold, wherein the at least one valley pixel is closer to the respective spot pixel region than to any other spot pixel region.

8. The image processing circuitry according to claim 6, wherein the instructions further cause the image processing circuitry to:

calculate the depth value for each of the spot pixel regions in the first set of spot pixel regions and the depth value for each of the spot pixel regions in the second set of spot pixel regions based on component values of at least one valley pixel in the valley pixel region, wherein the at least one valley pixel is closer to the respective spot pixel region than to any other spot pixel region.

9. The image processing circuitry according to claim 1, wherein the instructions further cause the image processing circuitry to:

remove, from the first set of spot pixel regions, spot pixel regions in which the total number of non-saturated pixels is below the predetermined number of non-saturated pixels.

10. The image processing circuitry according to claim 1, wherein the predetermined threshold is based on at least a linearity of a light response curve of the plurality of pixels.

11. An image processing method for a time-of-flight system comprising:

generating, based on obtained image data of a plurality of pixels representing a time-of-flight measurement of light reflected from a scene that is illuminated with spotted light, corresponding component data including component values of the plurality of pixels;

calculating, based on the generated component data, corresponding phase amplitude image data including phase amplitude values of the plurality of pixels;

determining, based on the calculated phase amplitude image data, spot pixel regions and a valley pixel region among the plurality of pixels;

determining, in each of the spot pixel regions, a spot peak pixel having a maximum phase amplitude value among the phase amplitude values of the respective spot pixel region;

determining a first set of spot pixel regions from among the spot pixel regions, wherein each spot pixel region in the first set has a spot peak level pixel with a maximum phase amplitude value that is above a predetermined threshold;

determining, in each of the spot pixel regions in the first set of spot pixel regions, a predetermined number of non-saturated pixels or non-saturated pixels in a predetermined range centered at the spot peak level pixel which have a phase amplitude value below the predetermined threshold; and calculating a depth value for each of the spot pixel regions in the first set of spot pixel regions based on component values of the predetermined number of non-saturated pixels.

12. The image processing method according to claim 11, further comprising:

correlating the calculated phase amplitude image data with a Gaussian kernel to obtain Gaussian correlated phase amplitude image data including correlated phase amplitude values of the plurality of pixels;

applying a local maximum filter on the Gaussian correlated phase amplitude image data to determine the spot pixel regions; and determining, for each of the spot pixel regions in the first set of spot pixel regions, a respective spot peak level pixel and the predetermined number of non-saturated pixels or the non-saturated pixels in a predetermined range centered at the spot peak level pixel based on the correlated phase amplitude values.

13. The image processing method according to claim 11, further comprising:

applying a local maximum filter on the calculated phase amplitude image data to estimate the spot pixel regions;

correlating the calculated phase amplitude image data with a Gaussian kernel to obtain Gaussian correlated phase amplitude image data including correlated phase amplitude values of the plurality of pixels, wherein a kernel size of the Gaussian kernel is based on a pixel range of the estimated spot pixel regions;

applying a local maximum filter on the Gaussian correlated phase amplitude image data to determine the spot pixel regions; and determining, for each of the spot pixel regions in the first set of spot pixel regions, a respective spot peak level pixel and the predetermined number of non-saturated pixels or the non-saturated pixels in a predetermined range centered at the spot peak level pixel based on the correlated phase amplitude values.

14. The image processing method according to claim 13, further comprising:

selecting the kernel size of the Gaussian kernel to be larger than the pixel range of the estimated spot pixel regions.

15. The image processing method according to claim 11, further comprising:

calculating a score map based on a learned magnitude relation of phase amplitude values of pixel pairs, wherein the spot pixel regions are determined by local extrema of the score map.

16. The image processing method according to claim 11, further comprising:

determining a second set of spot pixel regions from among the spot pixel regions, wherein each spot pixel region in the second set has a spot peak level pixel with a maximum phase amplitude value that is below the predetermined threshold; and calculating a depth value for each of the spot pixel regions in the second set based on component values of the respective spot peak pixel.

17. The image processing method according to claim 16, further comprising:

removing, from the first set of spot pixel regions and the second set of spot pixel regions, spot pixel regions in which a phase amplitude value of at least one valley pixel in the valley pixel region is above the predetermined threshold, wherein the at least one valley pixel is closer to the respective spot pixel region than to any other spot pixel region.

18. The image processing method according to claim 16, further comprising:

calculating the depth value for each of the spot pixel regions in the first set of spot pixel regions and the depth value for each of the spot pixel regions in the second set of spot pixel regions based on component values of at least one valley pixel in the valley pixel region, wherein the at least one valley pixel is closer to the respective spot pixel region than to any other spot pixel region.

19. The image processing method according to claim 11, further comprising:

removing, from the first set of spot pixel regions, spot pixel regions in which the total number of non-saturated pixels is below the predetermined number of non-saturated pixels.

20. The image processing method according to claim 11, wherein the predetermined threshold is based on at least a linearity of a light response curve of the plurality of pixels.

* * * * *